United States Patent
Medioni et al.

(10) Patent No.: US 9,418,475 B2
(45) Date of Patent: Aug. 16, 2016

(54) 3D BODY MODELING FROM ONE OR MORE DEPTH CAMERAS IN THE PRESENCE OF ARTICULATED MOTION

(71) Applicant: University of Southern California, Los Angeles, CA (US)

(72) Inventors: Gerard Guy Medioni, Los Angeles, CA (US); Jongmoo Choi, Gardena, CA (US); Ruizhe Wang, Pasadena, CA (US)

(73) Assignee: University of Southern California, Los Angeles, CA (US)

( * ) Notice: Subject to any disclaimer, the term of this patent is extended or adjusted under 35 U.S.C. 154(b) by 345 days.

(21) Appl. No.: 13/801,099

(22) Filed: Mar. 13, 2013

(65) Prior Publication Data

US 2013/0286012 A1      Oct. 31, 2013

Related U.S. Application Data

(60) Provisional application No. 61/638,405, filed on Apr. 25, 2012.

(51) Int. Cl.
*G06T 17/00* (2006.01)
*G06T 7/00* (2006.01)
*G06T 17/10* (2006.01)

(52) U.S. Cl.
CPC .............. *G06T 17/00* (2013.01); *G06T 7/0051* (2013.01); *G06T 7/0057* (2013.01); *G06T 7/0065* (2013.01); *G06T 17/10* (2013.01); *G06T 2207/10044* (2013.01); *G06T 2210/12* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 7,224,357 B2 | 5/2007 | Chen et al. | |
| 7,583,275 B2 | 9/2009 | Newmann et al. | |
| 7,856,125 B2 | 12/2010 | Medioni et al. | |
| 2002/0191818 A1 | 12/2002 | Matsuo et al. | |
| 2004/0027347 A1 | 2/2004 | Farsaie | |
| 2007/0031064 A1* | 2/2007 | Zhao et al. | 382/285 |
| 2007/0183651 A1* | 8/2007 | Comaniciu et al. | 382/154 |
| 2008/0031512 A1 | 2/2008 | Mundermann et al. | |
| 2008/0075326 A1* | 3/2008 | Otani et al. | 382/106 |
| 2008/0246759 A1 | 10/2008 | Summers | |
| 2010/0098328 A1 | 4/2010 | Se et al. | |
| 2010/0111370 A1* | 5/2010 | Black et al. | 382/111 |

(Continued)

OTHER PUBLICATIONS

Office Action dated Dec. 4, 2014, U.S. Appl. No. 13/749,318, 28 pages.

(Continued)

*Primary Examiner* — Xiao Wu
*Assistant Examiner* — Steven Elbinger
(74) *Attorney, Agent, or Firm* — Fish & Richardson P.C.

(57) ABSTRACT

The present disclosure describes systems and techniques relating to generating three dimensional (3D) models from range sensor data. According to an aspect, multiple 3D point clouds, which are captured using one or more 3D cameras, are obtained. At least two of the 3D point clouds correspond to different positions of a body relative to at least a single one of the one or more 3D cameras. Two or more of the 3D point clouds are identified as corresponding to two or more predefined poses, and a segmented representation of the body is generated, in accordance with a 3D part-based volumetric model including cylindrical representations, based on the two 3D point clouds identified as corresponding to the two predefined pose.

20 Claims, 13 Drawing Sheets

(56) References Cited

U.S. PATENT DOCUMENTS

| | | | |
|---|---|---|---|
| 2011/0267344 A1* | 11/2011 | Germann et al. | ............. 345/420 |
| 2011/0304619 A1 | 12/2011 | Fu | |
| 2013/0094694 A1* | 4/2013 | Newman | ............... G06T 7/2053 |
| | | | 382/103 |
| 2014/0118716 A1* | 5/2014 | Kaganovich | ............ G01S 17/89 |
| | | | 356/4.01 |

OTHER PUBLICATIONS

Curless et al., "A Volumetric Method for Building Complex Models from Range Images", Proc. SIGGRAPH, 1996, 10 pages.

Izadi et al., "KinectFusion: Real-time 3D Reconstruction and Interaction Using a Moving Depth Camera," ACM Symposium on User Interface Software and Technology, Oct. 2011, 10 pages.

Newcombe et al., "Live Dense Reconstruction with a Single Moving Camera", CVPR, 2010, 8 pages.

Weiss et al., "Home 3D Body Scans from Noisy Image and Range Data", Int. Conf. on Computer Vision, ICCV, Nov. 2011, 8 pages.

International Search Report and Written Opinion in International Application No. PCT/US2013/030942, mailed May 21, 2013, 9 pages.

International Search Report and Written Opinion in International Application No. PCT/US2013/023006, mailed May 16, 2013, 9 pages.

Chen and Medioni, "Object Modeling by Registration of Multiple Range Images," 1991 IEEE International Conference on Robotics and Automation, vol. 3, pp. 2724-2729.

Cui et al., "KinectAvatar: fully automatic body capture using a single kinect," Computer Vision-ACCV 2012 Workshops. Springer Berlin Heidelberg, 2013, 14 pages.

Li et al., "Robust single-view geometry and motion reconstruction," ACM Transactions on Graphics (TOG) 28.5 (2009): 175 (10 pages).

Liao et al., "Modeling deformable objects from a single depth camera," Computer Vision, 2009 IEEE 12th International Conference on. IEEE, 2009, 8 pages.

Microsoft Kinect Project, "Communicate with Computers Naturally," retrieved from the Internet on May 23, 2013, http://research.microsoft.com/en-us/um/redmond/projects/kinectsdk 1 page.

OpenNI, "What is OpenNI?", retrieved from the Internet on May 23, 2013, http://www.openni.org/ 5 pages.

Paris et al., "Bilateral Filtering: Theory and Applications," *Foundations and Trends in Computer Graphics and Vision*, 2008, 4(1):1-73.

Siddiqui and Medioni, "Human pose estimation from a single view point, real-time range sensor," Computer Vision and Pattern Recognition Workshops, 2010, pp. 1-8.

Tong et al., "Scanning 3D Full Human Bodies using Kinects," Dept. of Mathematics Zhejiang Univ. Apr. 3, 2012, Retrieved from the Internet. Retrieved on [Jul. 5, 2013], <URL: http://www.math.zju.edu.en/liangliu/cagd/projects/kinetics-capturinghumans/paper/paper-vr2012.pdf> 8 pages.

Weise et al., "Accurate and Robust Registration for In-hand Modeling," IEEE Conference on Computer Vision and Pattern Recognition, 2008, 8 pages.

\* cited by examiner

3D BODY MODELING FROM ONE OR MORE DEPTH CAMERAS IN THE PRESENCE OF ARTICULATED MOTION

CROSS REFERENCE TO RELATED APPLICATIONS

This application claims priority to U.S. Provisional Application Ser. No. 61/638,405, entitled "3D Body Modeling from one or more Depth Cameras in the Presence of Articulated Motion", filed Apr. 25, 2012, which is hereby incorporated by reference; and this application is related to U.S. patent application Ser. No. 13/749,318, entitled "3D Body Modeling, from a Single or Multiple 3D Cameras, in the Presence of Motion", filed Jan. 24, 2013, now U.S. Publication No. 2013-0187919, and issuing as U.S. Pat. No. 9,235,928 on Jan. 12, 2016.

BACKGROUND

The present disclosure describes systems and techniques relating to generating three dimensional models from range sensor data, for example, performing three dimensional modeling in the presence of articulated motion.

Three dimensional modeling from range sensor information is an active field. Many advances have been made in using software to build complex three dimensional models using range sensor information. For example, U.S. Pat. No. 7,583,275 to Newmann et al. describes generating a three dimensional model of an environment from range sensor information representing a height field for the environment. In addition, much work has gone into face recognition and reconstruction. For example, U.S. Pat. No. 7,856,125 to Medioni et al. describes a three dimensional face reconstruction technique using two dimensional images, such as photographs of a face. Other approaches for three dimensional modeling using images include those described in U.S. Pat. No. 7,224,357 to Chen et al.

SUMMARY

The present disclosure describes systems and techniques relating to generating three dimensional (3D) models from range sensor data. According to an aspect, multiple 3D point clouds, which are captured using one or more 3D cameras, are obtained. At least two of the 3D point clouds correspond to different positions of a body relative to at least a single one of the one or more 3D cameras. Two or more of the 3D point clouds are identified as corresponding to two or more predefined poses, and a segmented representation of the body is generated, in accordance with a 3D part-based volumetric model including cylindrical representations, based on the two or more 3D point clouds identified as corresponding to the two or more predefined poses.

The two or more identified 3D point clouds can be four of the 3D point clouds (e.g., corresponding to four predefined poses, including a forward pose, a left facing pose, a backward pose, and a right facing pose). The one or more 3D cameras can be a single 3D camera, obtaining the multiple 3D point clouds can include capturing the multiple 3D point clouds, and the segmented representation can include a segmented mesh representing the body.

The identifying can include automatically identifying the 3D point clouds without user input corresponding to the predefined poses. The generating can include registering the four 3D point clouds with each other, and building an initial model of the body using the four registered 3D point clouds. The generating can also include refining the initial model using one or more 3D point clouds other than the four 3D point clouds identified as corresponding to the four predefined poses and/or using iterative local registration of limbs and a torso for the body. In addition, the registering can include registering the two 3D points clouds corresponding to the forward pose and the left facing pose, registering the two 3D points clouds corresponding to the forward pose and the right facing pose, and registering the two 3D points clouds corresponding to the left facing pose and the backward pose.

A method for 3D body modeling using multiple depth images obtained from multiple real-time depth sensors (e.g., Microsoft Kinect Project using a PRIMESENSE™ camera & OpenNI) can be used to cover the entire body of a subject and generate an accurate 3D body model using multiple cylindrical representations. In addition, a 3D body model method (as described further herein) can handle the presence of motion and enables using multiple depth images taken from a single 3D camera. The multiple depth images can be obtained either by having a person move in front of a fixed sensor, or by moving the sensor around a person. In any case, the present systems and techniques can provide an accurate registration result between point clouds in the presence of articulation of body parts, and the model shape need not be limited to a subspace or be initialized before use. The method is also applicable to a multiple camera system with a moving subject.

According to other aspects, computer program products, encoded on a computer-readable medium, and computer systems are described that cause data processing apparatus to perform operations of the inventive methods. In various implementations, one or more of the following features and advantages can be provided. An accurate registration result between point clouds can be accomplished and an accurate 3D model of the human body surface can be generated from a single 3D camera (or more than one 3D camera) in the presence of articulation of body parts. In some implementations, four detected key views can be used to build a 3D body model, and the quality of 3D model can be improved using other views.

A whole body scanning system can employ a 3D camera previously purchased by a user and conveniently available at that user's home, and be usable by that same user in the whole body scanning system without any prior training or direction by another person. An articulated part-based cylindrical representation of 3D body model can be generated that supports a set of operations, such as composition, decomposition, filtering, and interpolation. Four key poses can be readily and automatically detected from a sequence or range of data frames using the methods described herein. These methods can further accomplish articulated registration between four key views corresponding to the four key poses. Moreover, a quantitative evaluation of modeling quality can be provided.

The above and other aspects and embodiments are described in greater detail in the drawings, the description and the claims.

DESCRIPTION OF DRAWINGS

Like reference numbers and designations in the various drawings indicate like elements.

DETAILED DESCRIPTION

Figure 1A:
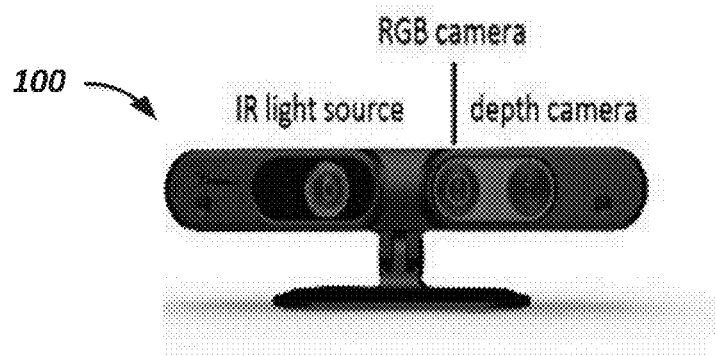
FIG. 1A shows a PRIMESENSE™ camera.

The following description details various sensor configurations for 3D body modeling from one or more cameras from a single 3D camera) and non-rigid registration method(s). In general, a 3D camera is a device that produces a set of 3D points with respect to the apparatus, regardless of whether the output data is a structured array or not. FIG. 1A shows a PRIMESENSE™ camera 100, which can be used as the acquisition hardware in some implementations. The PRIMESENSE™ camera 100 is available from PrimeSense Ltd. of Tel Aviv, Israel, and includes an infrared (IR) light source, an RGB camera and a depth camera. The PRIMESENSE™ camera 100 is sold as a single unit, and can thus be understood as a single camera or sensor, even though it includes multiple sensor devices. The sensor 100 can provide both a standard RGB image and a depth image containing the 3D information at 30 frames per second in Video Graphics Array (VGA) format. The sensor 100 can also provide RGB information in Super Extended Graphics Array (SXGA) format at 15 frames per second.

The 3D is computed in the infra-red domain thanks to a triangulation method. The sensor 100 can therefore provide results robust to illumination changes and can work in the dark. The hardware is inexpensive, but the low cost comes with a drop in the quality compared to other state of the art sensors. The resolution is only VGA and the depth data is very noisy, which is a challenge that can be overcome, using the techniques described herein, and in PCT/US2012/042792, which is hereby incorporated by reference. The openNI library (see http://www.openni.org) can be used to facilitate working with the depth information. The depth information can be converted to actual 3D information, and the RGB and depth data can be aligned properly, which enables working with both inputs at the same time.

Figure 1B:
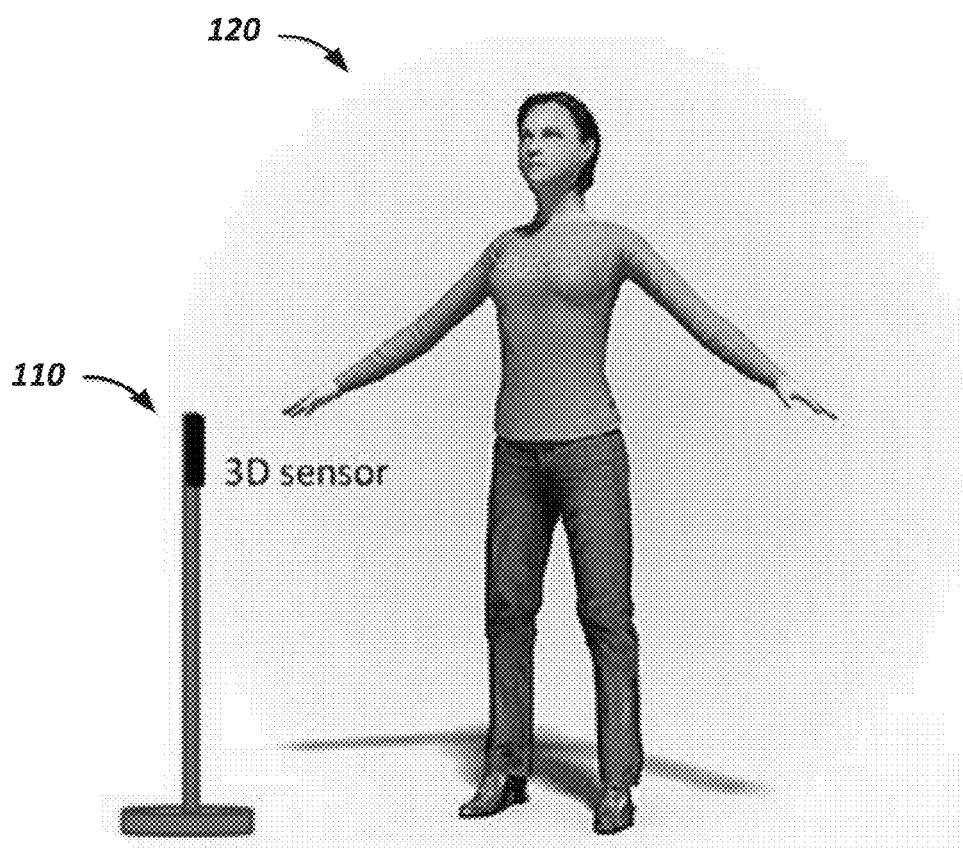
FIG. 1B shows a single sensor arrangement and basic body posture.

FIG. 1B shows a single sensor 110 arrangement and basic body posture 120. As shown, this sensor configuration uses only a single 3D camera 110, which can be the PRIMESENSE™ camera described above. The camera 110 can be mounted vertically (e.g., on a pole, as shown, or on a stand placed in the vicinity of a home entertainment system) to maximize the field of view. Also note that the camera 110 can be angled to maximize the coverage of the body. In some implementations, the subject turns his/her body in front of the fixed camera while the 3D camera 110 takes a depth video stream or a set of depth images. For full 3D body modeling, all sides of the body should be exposed to the sensor, and depth data corresponding to predefined poses should be registered with each other and possibly refined using addition depth data (such as described further below). In some implementations, all depth data is registered to a single reference.

FIG. 1B shows the basic posture 120 of a person for the 3D sensing. The depth data from this posture can be used as a reference for further registration steps. When the subject turns the body, the method selects four key frames from the sequence and registers them in a non-rigid manner. The system can provide a set of visual and/or audio introductions to guide the body rotation and posture of the subject. For example, the set of visual and/or audio introductions can direct the subject to move through predefined poses such as front, left, back, and right. In an alternative operational scenario, an operator can move a 3D camera 110 around the subject's body while the subject tries to stay with the fixed posture 120. Even in this scenario, the articulation of the body parts should be considered, which is different from standard registration methods or in-hand modeling methods for rigid objects. In any case, each of the captured 3D point clouds correspond to a different relative position of a 3D camera with respect to a body, regardless of whether the different relative positions are set by movement of a body with respect to a camera, movement of a camera with respect to the body, inputs from multiple cameras (which may be fixed in different locations), or a combination of these. Thus, the present methods are also applicable the case of multiple 3D cameras in the presence of articulated motion.

Figure 2:
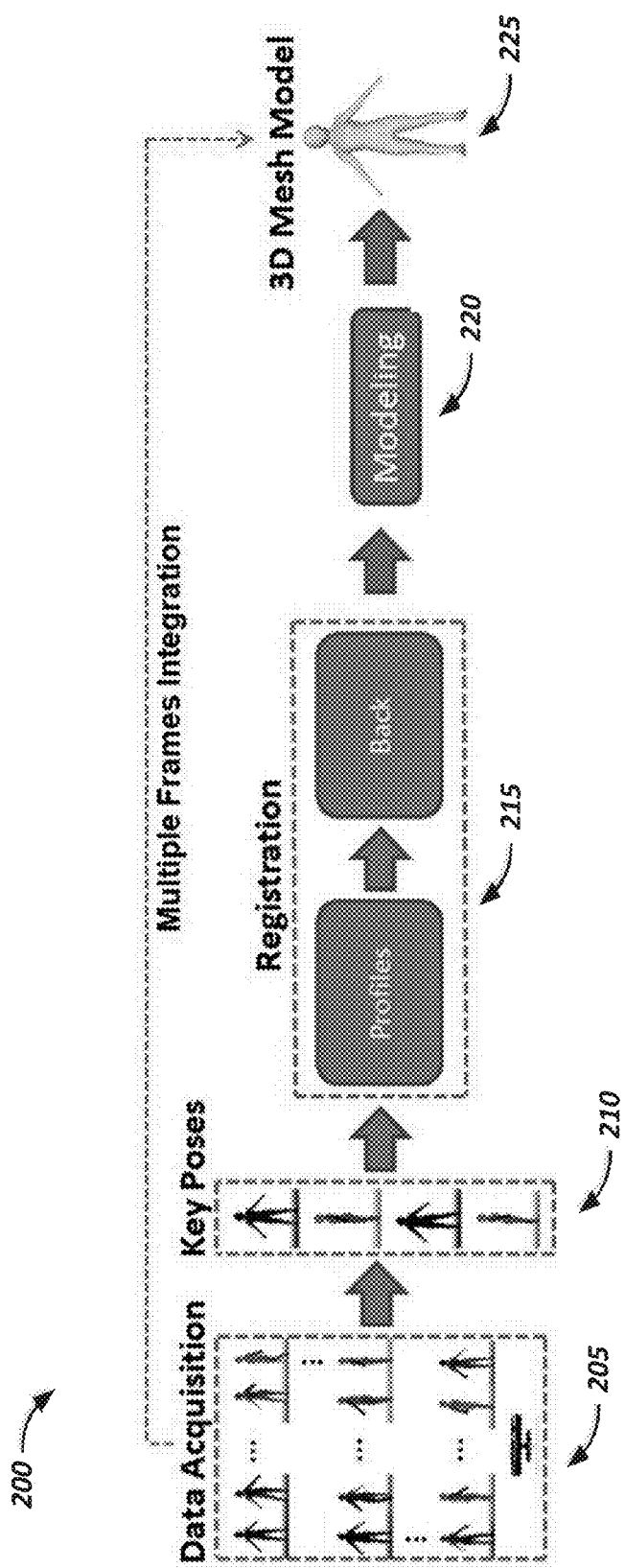
FIG. 2 shows a pipeline of a 3D whole body scanning system.

FIG. 2 shows a pipeline 200 of a 3D whole body scanning system. The pipeline 200 provides multiple frames integration for depth data acquired 205 using one or more 3D cameras, such as described above. In some implementations, a depth image stream is recorded while a user turns 360 degrees in front of a single fixed 3D camera (e.g., the camera 110 from FIG. 1A). Four key frames corresponding to key poses 210 can be selected from the whole sequence by detecting the user's pose in the stream, and registration 215 can be performed using these four key poses 210. The four key poses 210 can be front, back and two profiles.

In some implementations, the front (i.e., forward) pose can first be registered with the back (i.e., backward) pose before registration with the profiles (i.e., the left and right poses). In some implementations, as shown in FIG. 2, the registration 215 can involve registration of the profiles poses before registration with the back pose. Moreover, although registration is shown in FIG. 2 as being separate from modelling 220, it will be appreciated that, in some implementations, the registration 215 and modeling 220 processes can be combined with each other. Thus, registration 215 and modeling 220 need not be performed explicitly in series before a final segmented representation 225 (e.g., a 3D mesh model) is created.

In some implementations, articulated registration between the four views (i.e., the frames in the sequence identified as corresponding to predefined poses) can be achieved by minimizing the distance between the projected contours of the 3D model and the contours on the depth images of the corresponding four key views. To reduce the complexity of this optimization problem and to specifically avoid the correspondence searching problem, perspective projection can be relaxed to orthographic projection. Thus, the original global articulated registration problem can be decomposed into three similar local articulated registration problems, e.g., R1=front registered to (back or (left or right)), R2=R1 registered to ((left or right) or right or left)), and R3=R2 registered to ((right or left) or back). In some implementations, the three similar local articulated registrations need not be progressive. Thus, the sequence of registrations can be as follows: registration between left and front, registration between right and front, and registration between back and left & right. In any case, once the data corresponding to the predefined poses are registered, a hole-filled, noiseless, meshed 3D model can be generated using part-based cylindrical representation. In addition, more frames of the sequence can be integrated into the model to enhance details.

Figure 3A:
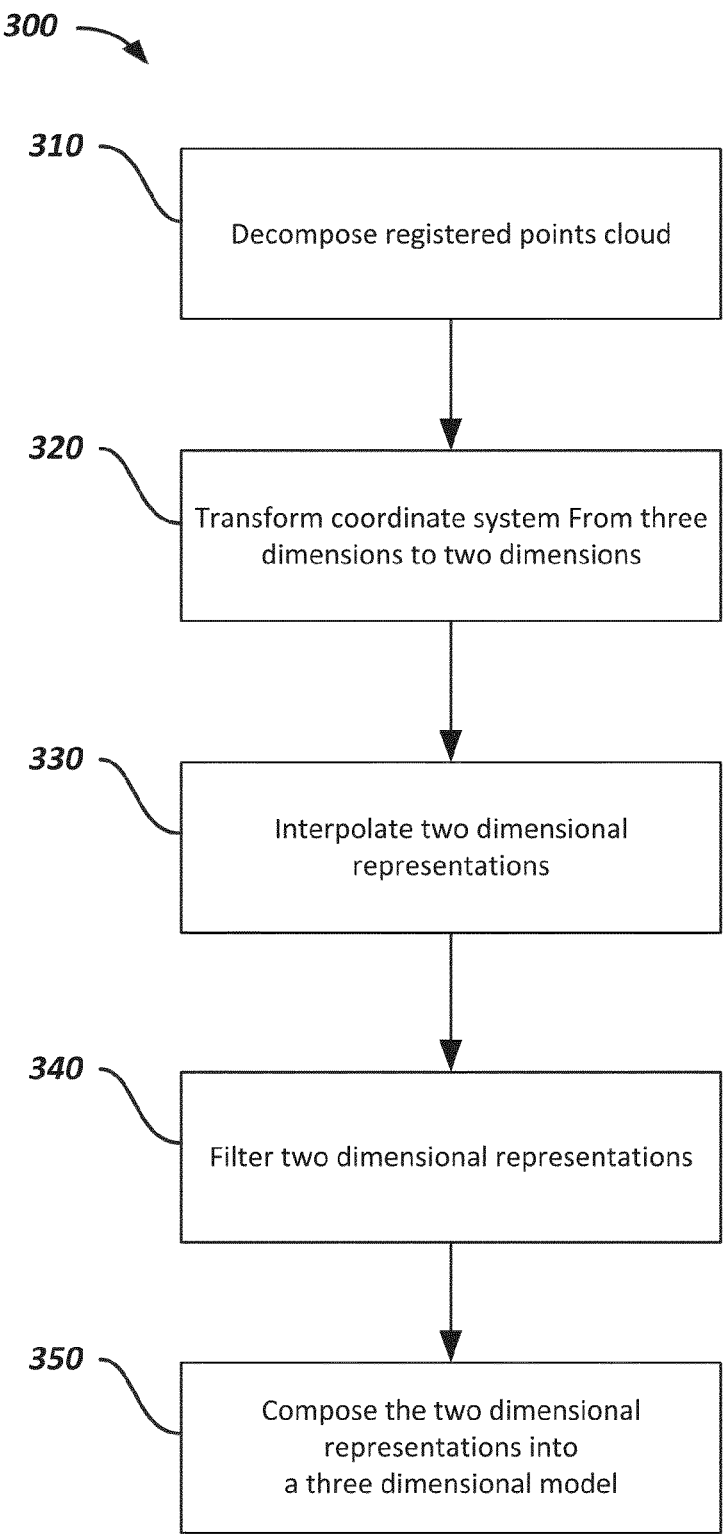
FIGS. 3A & 3B show an example of a process for modelling a whole body, as can be employed in the pipeline of FIG. 2.
Figure 3B:
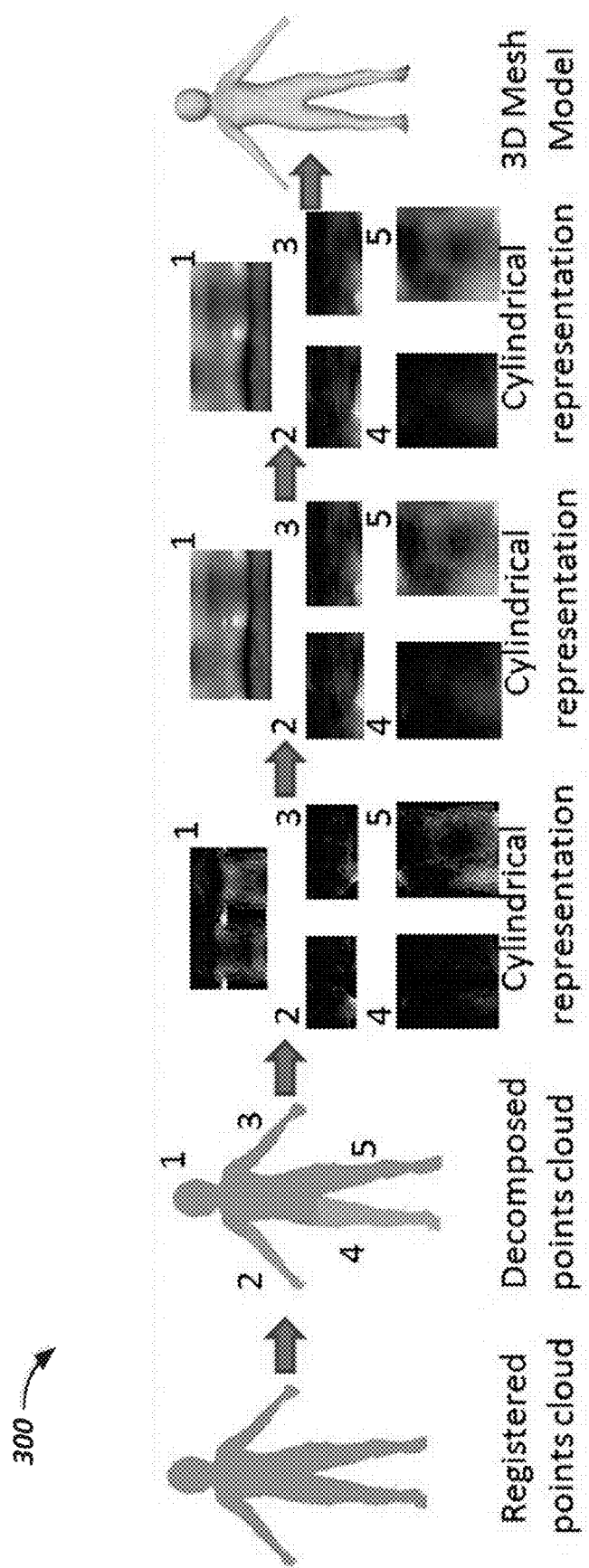

FIGS. 3A & 3B show an example of a process 300 for modelling a whole body, as can be employed in the pipeline of FIG. 2. The registered points cloud data coming from the four key views) is decomposed at 310 into a set of rigid objects. As shown in FIG. 3B, the set of rigid objects can be five objects corresponding to a torso 1, a right arm 2, aloft arm 3, a right leg 4, and a left leg 5. Both the registered points cloud and the decomposed points cloud created therefrom are 3D data.

The coordinate system of the decomposed points cloud is then transformed at 320 to two dimensions. The resulting 2D data can be five cylindrical representations corresponding to the five rigid objects, as shown in FIG. 3B. This 2D data can then be interpolated at 330, e.g., to fill any holes in the data. The interpolated 2D data can then be filtered at 340, e.g., to reduce noise. Finally, the filtered 2D data can be composed into a 3D mesh model at 350. While the example process of FIGS. 3A & 3B uses five rigid objects, it will be appreciated that other implementations can use differing numbers of rigid objects to model the whole body.

Figure 4A:
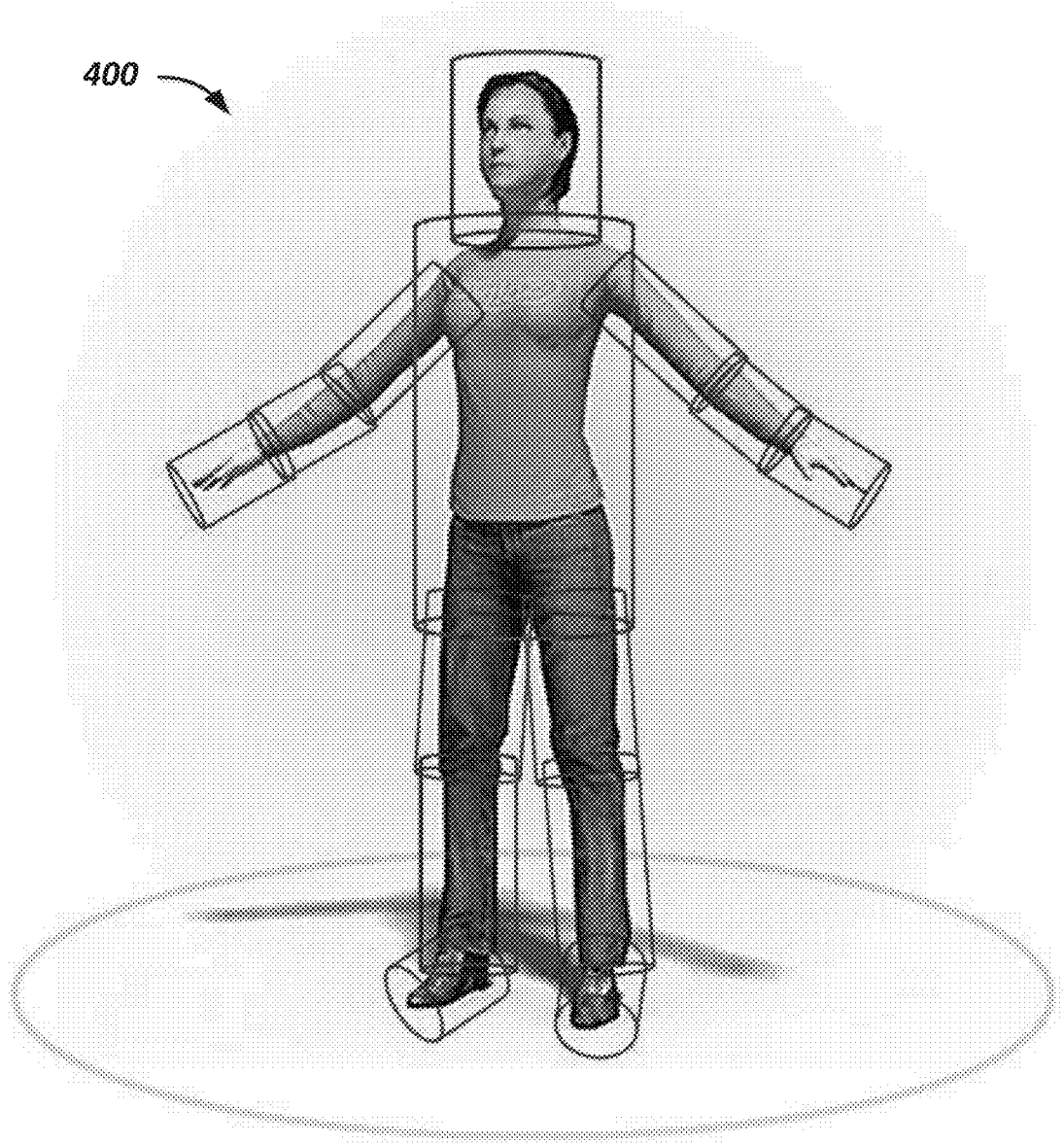
FIG. 4A shows the full body configuration of a human subject modeled as articulation of a set of fourteen rigid objects.

FIG. 4A shows the full body configuration of a human subject modeled as articulation of a set of fourteen rigid objects 400. In a cooperative sensing scenario, the global motion between different views can be modeled as a rigid motion, as a first approximation. Then, a body part such as a limb, which has some residual (local) error from the global registration, can be registered separately as an individual rigid object. Based on this idea, the global body shape can be registered and then local body parts can be refined to produce a registered full body 3D point cloud. Alternatively, the initial rigid transformation can be obtained by detecting the points belonging to the limbs, and removing them, and finally computing a rigid transformation for the remaining points.

As shown in FIG. 4A, the rigid objects 400 are cylinders, or more generally cylindrical representations, which are employed to describe the shape of the person. The cylindrical representation makes it possible to use 2D operators on 3D data (e.g., hole filling, blending, sampling), which is a key reason for using it. As a main drawback of this representation, careful attention should be paid to the joining part between two cylinders.

Figure 4B:
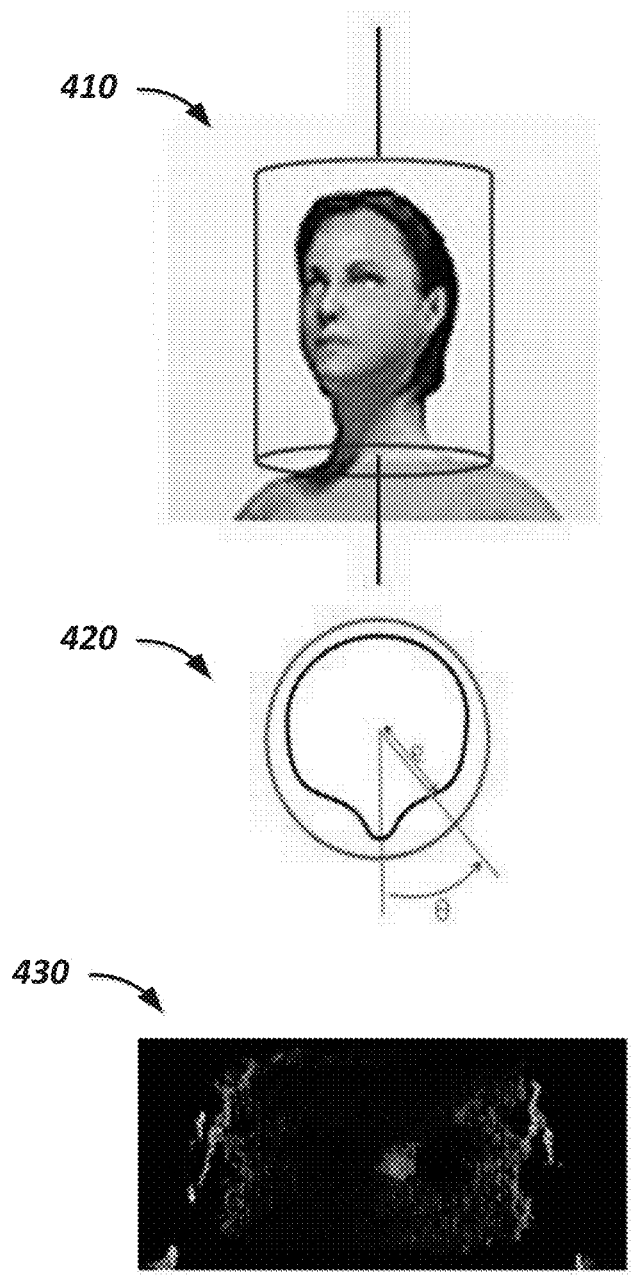
FIG. 4B shows details for a cylindrical representation used to model a body part.

FIG. 4B shows details for a cylindrical representation used to model a body part 410. The internal representation can be that of an image $R(x,\theta)$ 330, where R represent, for example, the radius value of the cylinder 420 at position x along the axis, and $\theta$ the angle. This is called a cylindrical image representation, as shown in FIG. 4B. An advantage of using such a representation is that smoothing can be performed efficiently using image-based operators, instead of mesh-based operators.

Spatial smoothing can be performed to remove the noise inherent in the data capture stage using such low cost 3D cameras. For spatial filtering, a bilateral filter can be used, which can remove the noise while keeping the edges. This filtering process is fast thanks to the cylindrical representation of the model. If multiple temporal instances of a view are acquired, temporal smoothing can be performed, which can further reduce noise. For multiple observations, a running mean can be applied on the value of each pixel of the unwrapped cylindrical map 430. This temporal integration enables reduction of the intrinsic noise while aggregating the data. When the whole data has been aggregated, a linear interpolation method can be applied to fill up any remaining holes in the cylindrical map.

Figure 5:
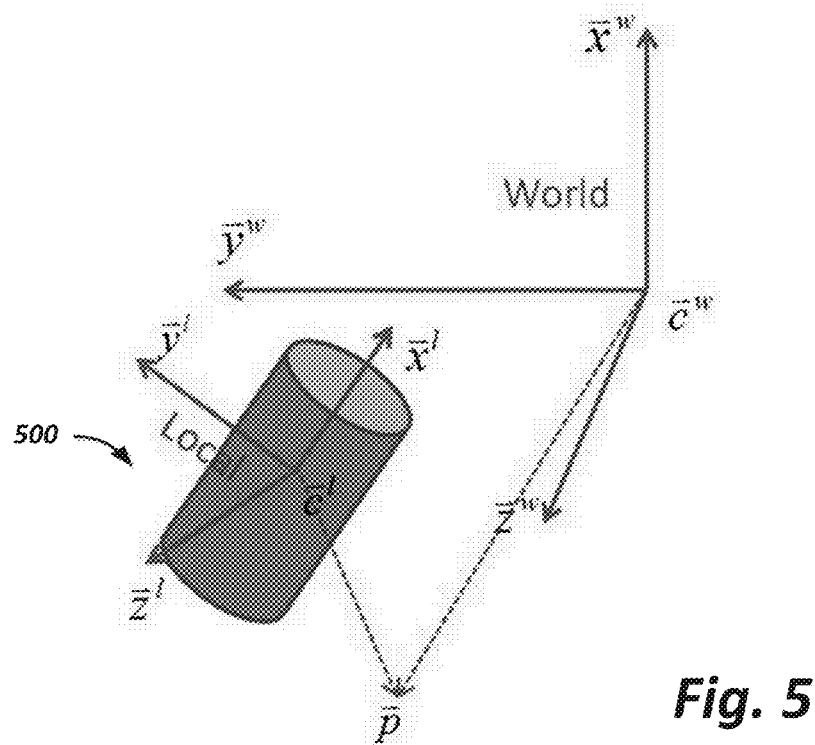
FIG. 5 shows a cylinder representation used to illustrate transformation between coordinate systems.

As will be appreciated, a whole body scanning system that employs such cylindrical representations will also employ transformations between coordinate systems. FIG. 5 shows a cylinder 500 used to illustrate transformation between coordinate systems. In connection with FIG. 5, two types of transformations are described: (1) a transformation between the world Cartesian coordinate system (i.e., sensor Cartesian coordinate system) and the local (e.g., limbs and torso) Cartesian coordinate system; and (2) a transformation between the local Cartesian coordinate system and the local cylindrical coordinate system (i.e., local 2D depth map). These two types of transformations are shown in FIG. 5, where $\hat{x}^w$, $\hat{y}^w$, $\hat{z}^w$ are a set of orthogonal unit vectors, and $\bar{c}^w$ is a vector in space. These form the world Cartesian coordinate system in space.

For the Cartesian coordinate system, $\hat{x}^l$, $\hat{y}^l$, $\hat{z}^l$ and $\bar{c}^l$ have similar meanings. These form the local Cartesian coordinate system, and $\bar{p}$ is any point in space which can be represented either in the world coordinate system or in the local coordinate system, $\bar{p}=p_x^w \hat{x}^w + p_y^w \hat{y}^w + p_z^w \hat{z}^w + \bar{c}^w$ or $\bar{p}=p_x^l \hat{x}^l + p_y^l \hat{y}^l + p_z^l \hat{z}^l + \bar{c}^l$. In the following derivation, a more compact vector inner product form is used, so that:

$$\bar{p} = [p_x^w, p_y^w, p_z^w] \begin{bmatrix} \hat{x}^w \\ \hat{y}^w \\ \hat{z}^w \end{bmatrix} + \bar{c}^w$$

and $$\bar{p} = [p_x^l, p_y^l, p_z^l] \begin{bmatrix} \hat{x}^l \\ \hat{y}^l \\ \hat{z}^l \end{bmatrix} + \bar{c}^l.$$

Transformation between the world Cartesian coordinate system and the local Cartesian coordinate system is represented by $(p_x^w, p_y^w, p_z^w) \leftrightarrow (p_x^l, p_y^l, p_z^l)$. Assuming that the local coordinate system can already be represented in the world coordinate system, $$\begin{bmatrix} \hat{x}^l \\ \hat{y}^l \\ \hat{z}^l \end{bmatrix} = \begin{bmatrix} a_{11}, a_{12}, a_{13} \\ a_{21}, a_{22}, a_{23} \\ a_{31}, a_{32}, a_{33} \end{bmatrix} \begin{bmatrix} \hat{x}^w \\ \hat{y}^w \\ \hat{z}^w \end{bmatrix},$$

$$\vec{c}^l = [b_{11}, b_{12}, b_{13}] \begin{bmatrix} \hat{x}^w \\ \hat{y}^w \\ \hat{z}^w \end{bmatrix} + \vec{c}^w.$$

A single point in space can then be described in both coordinate systems as $p_x^l, p_y^l, p_z^l, (p_x^w, p_y^w, p_z^w)$ respectively, and the following formula is provided:

$$[p_x^l, p_y^l, p_z^l] \begin{bmatrix} \hat{x}^l \\ \hat{y}^l \\ \hat{z}^l \end{bmatrix} +$$

$$\vec{c}^l = [p_x^l, p_y^l, p_z^l] \begin{bmatrix} a_{11}, a_{12}, a_{13} \\ a_{21}, a_{22}, a_{23} \\ a_{31}, a_{32}, a_{33} \end{bmatrix} \begin{bmatrix} \hat{x}^w \\ \hat{y}^w \\ \hat{z}^w \end{bmatrix} + [b_{11}, b_{12}, b_{13}] \begin{bmatrix} \hat{x}^w \\ \hat{y}^w \\ \hat{z}^w \end{bmatrix} + \vec{c}^w$$

and $$[p_x^l, p_y^l, p_z^l] \begin{bmatrix} \hat{x}^l \\ \hat{y}^l \\ \hat{z}^l \end{bmatrix} + \vec{c}^l = [p_x^w, p_y^w, p_z^w] \begin{bmatrix} \hat{x}^w \\ \hat{y}^w \\ \hat{z}^w \end{bmatrix} + \vec{c}^w.$$

From which, the following formula is also provided:

$$[p_x^l, p_y^l, p_z^l] \begin{bmatrix} a_{11}, a_{12}, a_{13} \\ a_{21}, a_{22}, a_{23} \\ a_{31}, a_{32}, a_{33} \end{bmatrix} + [b_{11}, b_{12}, b_{13}] = [p_x^w, p_y^w, p_z^w].$$

This formula gives both the transformation and the inverse transformation between the world and the local coordinate systems.

Transformation between the local Cartesian coordinate system and the local cylindrical coordinate system is represented by $[p_x^l, p_y^l, p_z^l] \leftrightarrow [\rho^l, \theta^l, z^l]$. The formula can be given by:

$$\rho^l = \sqrt{(p_x^l)^2 + (p_y^l)^2}$$

$$\theta^l = \sin^{-1}(p_x^l/\rho^l).$$

$$z^l = z_l$$

Both the transformation between the world Cartesian coordinate system and the local Cartesian coordinate system, and the transformation between the local Cartesian coordinate system and the local cylindrical coordinate system, can be calculated in two ways. Thus, $[p_x^w, p_y^w, p_z^w] \leftrightarrow [p_x^l, p_y^l, p_z^l] \leftrightarrow [\rho^l, \theta^l, z^l]$. Moreover, both types of transformations can be used in the modelling processes described herein.

Figure 6:
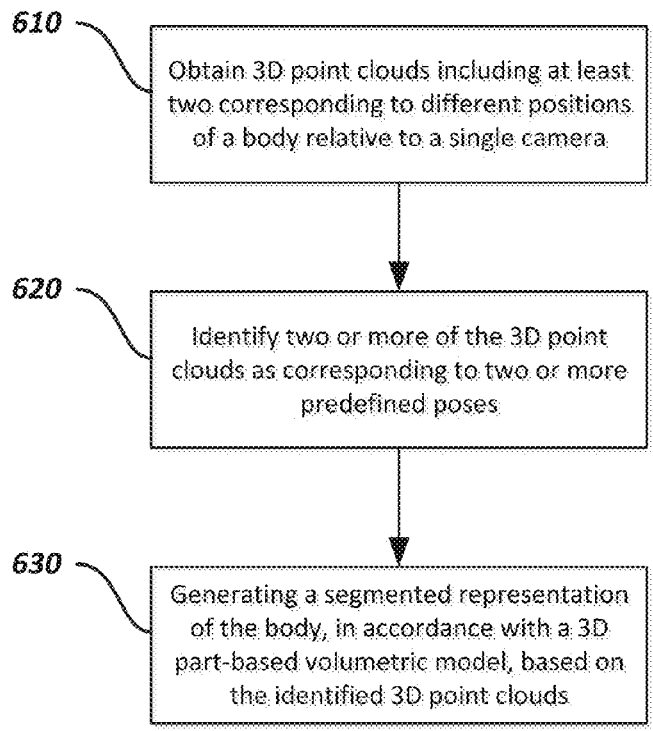
FIG. 6 shows a process of integrating point clouds to form a segmented representation of a body.

FIG. 6 shows a process of integrating point clouds to form a segmented representation of a body. This process and other processes described herein can be methods performed by a computer system including processor electronics and at least one memory device, as will be appreciated by those of ordinary skill in the art. At 610, multiple 3D point clouds can be obtained, where these 3D point clouds have been captured using one or more 3D cameras, as described in detail above. At least two of the 3D point clouds correspond to different positions of a body relative to at least a single one of the one or more 3D cameras. For example, a depth image stream can be obtained, where this stream includes a sequence of frames recorded while a user turned 360 degrees in front of a single 3D camera. Obtaining the 3D point clouds can include capturing the multiple 3D point clouds using the one or more 3D cameras, or merely receiving the multiple 3D point clouds from another system or process.

At 620, two or more of the 3D point clouds can be identified as corresponding to two or more predefined poses. For example, the two or more predefined poses can be four predefined poses (including a forward pose, a left facing pose, a backward pose, and a right facing pose), and the identifying can be performed automatically without user input corresponding to the predefined poses (e.g., without the user specifically calling out when each of the four poses are reached).

At 630, a segmented representation of the body (e.g., a segmented mesh representing the body) is generated in accordance with a 3D part-based volumetric model. As described above, the 3D part-based volumetric model can be composed of cylindrical representations, and the generation of the model can be based on the 3D point clouds identified as corresponding to the predefined poses. Various detailed examples of this general process will now be described.

Figure 7A:
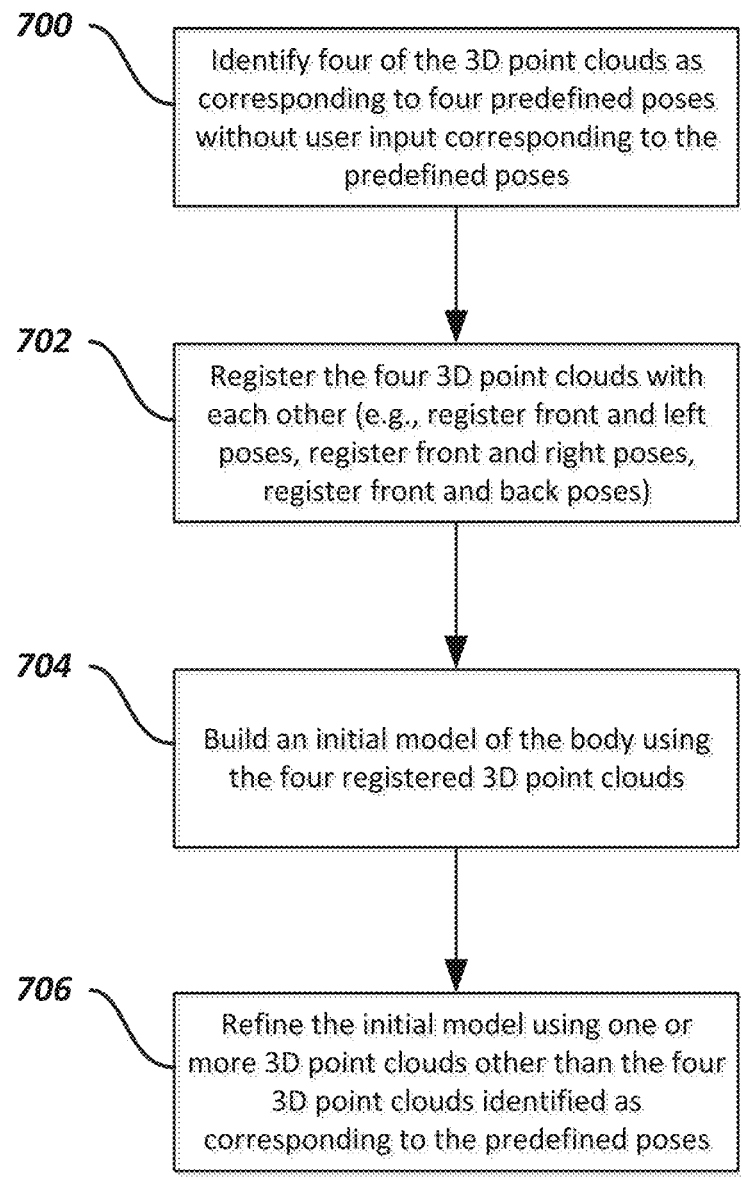
FIG. 7A shows an example of a process of building a model of a body.

FIG. 7A shows an example of a process of building a model of a body. At 700, four of the 3D point clouds are identified as corresponding to four predefined poses without user input corresponding to the predefined poses. To assist in this process, preferably during data acquisition, the user remains static at four key postures for a moment while turning the body in front of the camera. In any case, the four key views that correspond (approximately) to 0, 90, 180 and 270 degrees of rotation can be picked up in the data stream, while the moving person in the data stream is regarded as a set of cylinders in space with an articulated motion.

The input to the system can be N depth image frames or a sample of N frames from the video stream, and the N frames can be converted to 3D meshed points clouds: D(0), D(1), . . . , D(N). The first frame can be taken as the front pose and set as the global reference. In addition, after the defining of planes to segment the front pose, this segmentation can remain the same for other views.

Figure 7B:
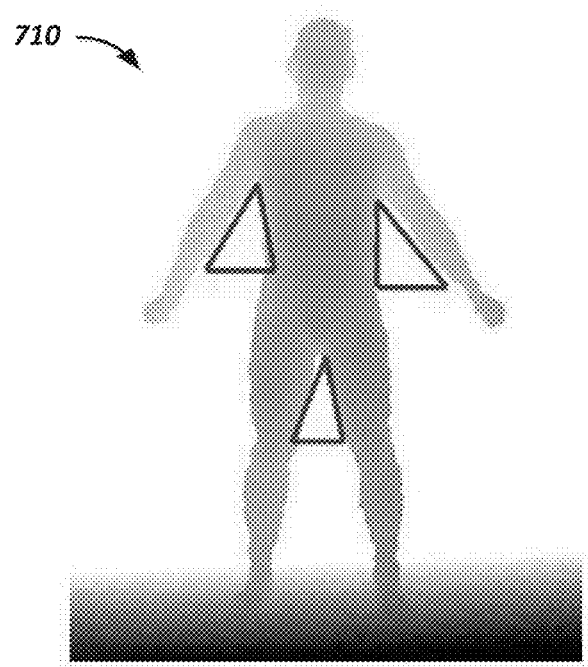
FIGS. 7B & 7C show an example of body segmentation for a front pose.
Figure 7C:
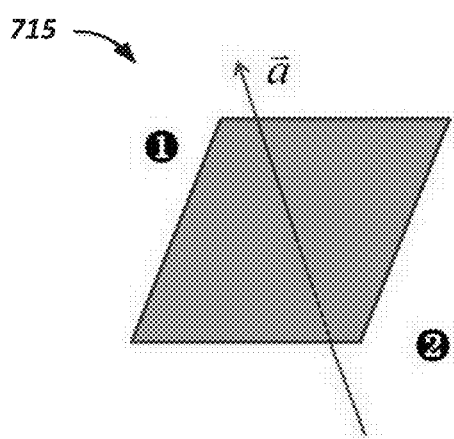

FIGS. 7B & 7C show an example of body segmentation for a front pose. As shown in FIG. 7B, critical points detection can be accomplished using a heuristic method in which a triangle-shaped gap is searched over the depth map 710 of the front view. The vertex of each triangle can be mapped back to the world coordinate system, which is exactly the location of a critical point as shown in FIG. 7B. Once the critical points are detected, they can be used to decompose the whole body into several rigid parts, which can be mapped to cylindrical representations. The decomposition can be achieved by introducing a plane geometry 715 as shown in FIG. 7C, where a single plane separates a volume of 3D space into two spaces. Section 1 can be represented as $\{\bar{p}: \bar{p} \cdot \bar{a} > d\}$, and section 2 can be represented as $\{\bar{p}: \bar{p} \cdot \bar{a} < d\}$, where $\bar{a}$ is orthogonal to the plane, and d is the value such that the points on the plane satisfy $\{\bar{p}: \bar{p} \cdot \bar{a} = d\}$. Thus, the decomposition is fast and easy since the computation requires only inner product.

Alternatively, the segmentation of the body into several parts can be solved in other ways, such as using model fitting, pose estimation, or using another heuristic method. For example, a heuristic method can include detecting critical points, then iteratively extracting skeleton information, and decomposing the whole body based on the skeleton information. Once the skeleton is obtained out of the front pose, it can be fixed for decomposition of the other three poses. The vertices connecting two rigid parts can be assigned two transformations whose weights sum to one. This model is known as Linear Blend Skinning (LBS) in the graphics community. Further details are provided below in connection with discussion of registration.

Referring again to FIG. 7A, the backside view is also identified at 700. Once the front frame is selected, selection of the back frame can be performed by looking for a generally static frame. A static frame indicates the motion between two consecutive frames is as small as possible. One approach to this is to use general optical flow techniques. However, a less computationally intensive method can be as follows.

Figure 7D:
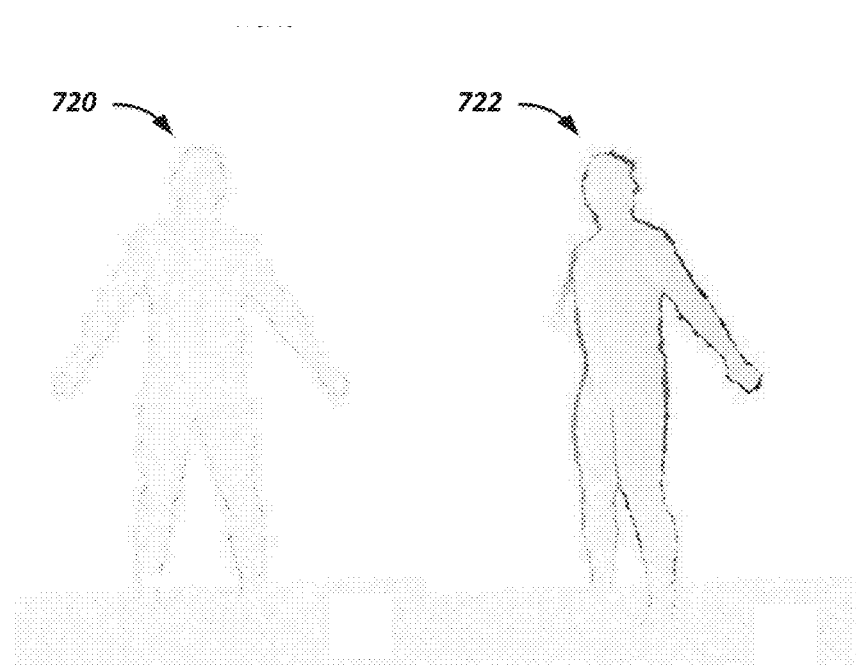
FIG. 7D shows difference maps with motion and without motion.

Assuming that the person is the only moving object in the scene, a pixel-wise absolute difference map between two consecutive depth maps is obtained. FIG. 7D shows difference maps with motion and without motion. As shown, a difference map without motion 720 is quite different from a difference map with motion 722. The difference map without motion 720 shows limited differences on the boundary which are mainly coming from the sensor error. The difference map with motion 722, however, shows much bigger differences on the boundary which are coming from the motion of the person.

Defining the difference map to be $D^{(k)}_{i,j}$, the number of big differences to be $N^{(k)}=|\{(i,j):D^{(k)}_{i,j}>d_{threshold}\}|$, where (k) stands for the index of frame, (i, j) stands for the index of the difference map, and $d_{threshold}$ represents a predefined value of big difference, it follows that for a static frame $N^{(k)}<N_{threshold}$ and for a non-static frame $N^{(k)}>N_{threshold}$. As a front frame is detected, the global structure of the torso and legs can be extracted using PCA (Principal Component Analysis) or a heuristic method, e.g., PCA can be used to extract the directions of the torso and two legs from the front view. The same directions from the back view should be parallel to that from the corresponding front view. Hence, by checking the angles between two pairs of directions as an additional criterion for the back view selection, it is found that:

$$\theta_{torso} = \cos^{-1}\left(\frac{|\vec{v}_{front\_torso} \cdot \vec{v}_{back\_torso}|}{\|\vec{v}_{front\_torso}\| * \|\vec{v}_{front\_torso}\|}\right) < \theta_{threshold}$$

$$\theta_{legs} = \cos^{-1}\left(\frac{|\vec{v}_{front\_legs} \cdot \vec{v}_{back\_legs}|}{\|\vec{v}_{front\_legs}\| * \|\vec{v}_{front\_legs}\|}\right) < \theta_{threshold}.$$

$\theta_{torso}$ is the angle between the direction of the torso in the front view and the direction of the torso in the current view, and $\theta_{legs}$ has similar meaning. To have a torso parallel to the corresponding torso in the front frame, and parallel legs, then both $\theta_{torso}$ and $\theta_{legs}$ should be small. This can be checked using $\theta_{threshold}$. Thus, by looking for parallel legs and parallel torso, the back view can be identified.

Figure 7E:
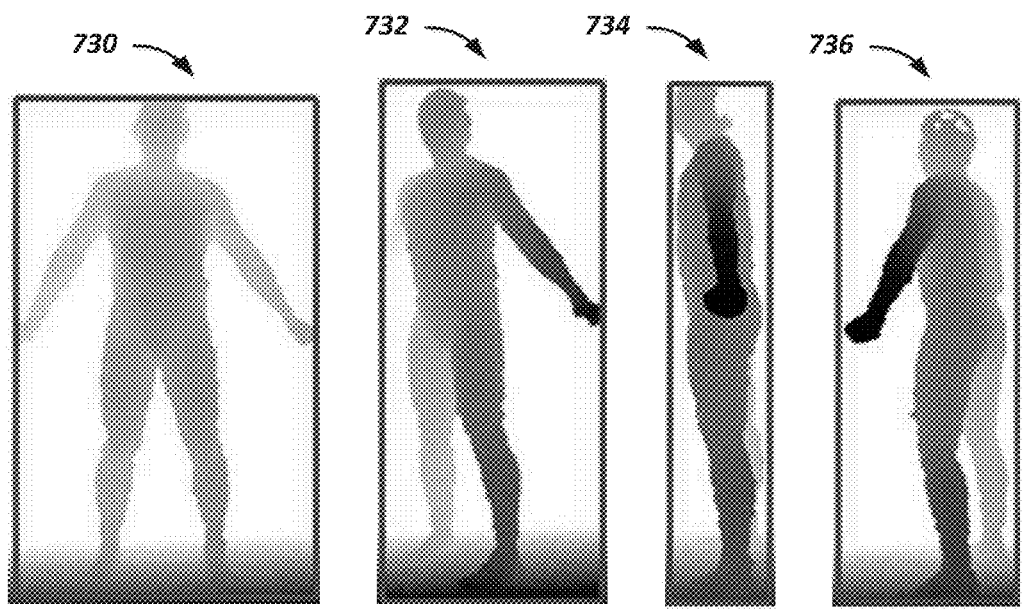
FIG. 7E shows a width of a bounding box in a sequence of depth maps changing over time.

Once the front and back frames are selected, the two side views can be identified using the static frame technique described above in connection with looking at the width of a bounding box in the depth map. FIG. 7E shows a width of a bounding box in a sequence of depth maps changing over time, including the widths of a bounding box 730 of a front view, a bounding box 732 of a 45 degree view, a bounding box 734 of a left side (90 degree) view, and a bounding box 736 of a 135 degree view. The side views have the smallest width of the bounding box, assuming two arms are within the side view of the torso. Thus, the two frames with the smallest bounding boxes in regions around the other two static frames can be chosen as the first and second side views. The left side view can be distinguished from the right side view by detecting the rotating direction of the subject. If the subject is turning left, then the left side view is the first side view, and the right side view is the second side view, and vice versa if the subject is turning right.

Referring again to FIG. 7A, the four 3D point clouds corresponding to the four predefined poses are registered with each other at 702. This can involve initially registering the front and back views, or initially registering the front and either the left or right views. The remaining views can then be registered in sequence. For example, the registering can include registering the two 3D points clouds corresponding to the forward pose and the left facing pose, registering the two 3D points clouds corresponding to the forward pose and the right facing pose, and then registering the two 3D points clouds corresponding to the left facing pose and the backward pose.

An initial model of the body can be built at 704 using the four registered 3D point clouds. This can involve building the initial model in three dimensions, creating two dimensional cylindrical representations of segments of the body being modelled, or both. Then, the initial model can be refined at 706 using one or more 3D point clouds other than the four 3D point clouds identified as corresponding to the four predefined poses. Various examples of detailed implementations of the process of FIG. 7A will now be described.

Non-rigid or articulated registration of the four key frames generally begins with rigid global registration (using rigid transformations) followed by decomposition and then local registrations of body parts. The decomposition needs to be performed before the local registration and can be performed as described above. In some implementations, the rigid transformation registration can begin by aligning the front view and the back view, followed by adding the two side views later. Registration between the front view and the back view can begin by aligning the global structure extracted by PCA. Then the back view can be rotated along the x axis to simulate the actual turning process. Finally, the back view can be shifted along the z axis for an approximate value to correspond to the width of the torso. Here, the value can be predefined or roughly extracted from the side view. It need not be precise since a local registration will be processed to refine the width of the torso.

After the front view and the back view are registered, an initial model of the whole body can be built. Though the model is not overly accurate, it is still helpful when registering two side views to the reference frame. The process of registering two side views to the reference frame can be performed in accordance with the following algorithm:

Input: pts_LeftSide, pts_RightSide
Output: pts_LeftSide $^{ref}$, pts_RightSide $^{ref}$
1. Use pts_Front $^{ref}$, pts_Back $^{ref}$ to build init_model consists of a set of
   cylinders ← → (a set of 2D cylindrical maps)
2. Fill holes on init_model ← → (linear interpolation on cylindrical maps)
3. Sample points from left view of the model to get pts_LeftSide $^{model}$
   3-1. 2D cylindrical maps → 3D points cloud
   3-2. Sample only left view points from 3D points
   cloud → pts_LeftSide$^{model}$
4. Register pts_LeftSide to pts_LeftSide $^{model}$ to get pts_LeftSide $^{ref}$
   using EM-ICP
5. Sample points from right view of the model to get pts_RightSide$^{model}$
   5-1. 2D cylindrical maps → 3D points cloud
   5-2. Sample only right view points from 3D points cloud →
   pts_RightSide$^{model}$
6. Register pts_RightSide to pts_RightSide $^{model}$ to get pts_RightSide $^{ref}$
   using EM-ICP After global registration, the decomposed body will have three or four point clouds for each part (note that each leg will likely only have three point clouds since the view from the other side is blocked by the other leg). Each body limb will have a local coordinate system, which can have its origin located at the joining portion of the limb, which connects the limb to the torso. Using this as a predefined reference, the back view and the side view can be iteratively registered with respect to the front view. To simplify, the registration of the back view to the front view can be restricted to 2 DOF (Degree of Freedom), i.e., a rotation along the y axis and a translation along the z axis. The other DOF are all likely well approximated by the global registration. The registration of the side view with respect to the front view still has 6 DOF, and the back view and the side view can be iteratively registered to the front view. The process of iterative local registration can be performed in accordance with the following algorithm:

Input: pts_Back_Limb $^{ref}$, pts_Side_Limb $^{ref}$
Output: pts_Back_Limb $^{ref}$ (refined), pts_Side_Limb $^{ref}$ (refined)
1. Use pts_Front_Limb $^{ref}$, pts_Back_Limb $^{ref}$ and local coordinate system to build a cylinder. ← → (a 2D cylindrical map)
2. Fill holes on the cylinder. ← → (linear interpolation on 2D cylindrical map)
3. Sample points from side view of cylinder to get pts_Side_Limb $^{model}$
  3-1. 2D cylindrical map → 3D points cloud
  3-2. Sample only side view points from 3D points cloud → pts_Side_Limb $^{model}$
4. Register pts_Side_Limb $^{ref}$ to pts_Side_Limb $^{model}$ by using EM-ICP
5. Register pts_Back_Limb $^{ref}$ based on pts_Front_Limb $^{ref}$ and pts_Side_Limb $^{ref}$ (Sub-Algorithm)
6. Check the magnitude of rotation angle and translation vector of step 5.
  if (\transformation\<threshold) stop
    else repeat step 1.

The alignment based on width information can be performed in accordance with the following sub-algorithm (referenced above):

Input: pts_Back_Limb $^{ref}$, pts_Front_Limb $^{ref}$, pts_Side_Limb $^{ref}$
Output: Transformation R, t on pts_Back_Limb $^{ref}$
% We are processing in limb-centered local coordinate system
1. Look along y direction, divide pts_Side_Limb $^{ref}$ into N bins at constant intervals along x direction.
2. For each bin, search over all the points to find z_max and z_min.
3. For each bin, assign value (z_max-z_min) to it. Now we have a vector Width_side of size N.
4. Repeat 1, 2, 3 on pts_Back_Limb $^{ref}$, pts_Front_Limb $^{ref}$ to get another vector Width_front_back of size N.
5. Use a line to fit vector (Width_front_back-Width_side)
6. Calculate rotation angle along y axis and translation along z axis from the line.
7. Calculate R, t from rotation angle and translation vector.

After local registration of the limbs, local registration of the torso can be performed. The data for the torso will likely have significant occlusions (e.g., caused by the positioning of the arms and positioning of the camera with respect to the neck and shoulders). This issue can be addressed by considering the connectivity between four limbs and torso. At the last step, while registering four limbs segmented from the back view, the four joints are also registered. These are not only connected to four limbs, but also to the torso. Hence, the problem can be cast as finding the transformation matrix from four corresponding points (each joint is abstracted as a point). Denoting the location of four joints before the local registration $J_{left\_leg}, J_{right\_leg}, J_{left\_arm}, J_{right\_arm}$, and the location after the local registration as $J_{left\_leg}^l, J_{right\_leg}^l, J_{left\_arm}^l, J_{right\_arm}^l$, the issue can be addressed using:

$$\min_{R,t} \sum_{i \in \left\{ \substack{left\_leg, left\_arm, \\ right\_leg, right\_arm} \right\}} \left\| R\vec{J}_i + t - \vec{J}_i^l \right\|_2$$

such that $RR^t = 1$.

Figure 8:
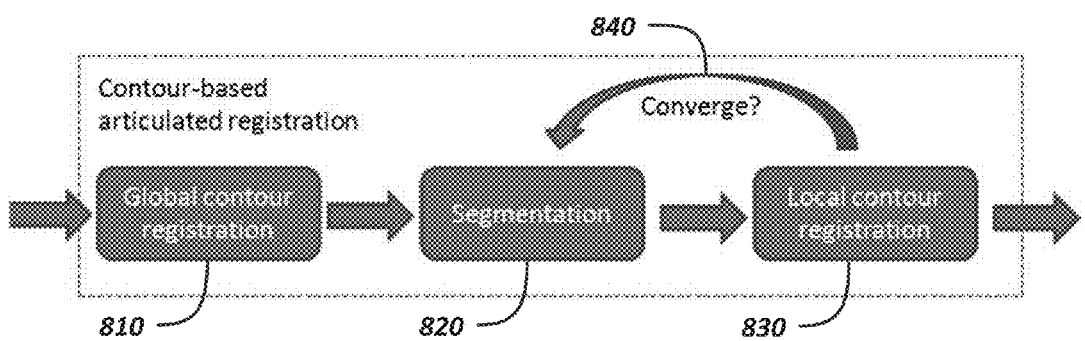
FIG. 8 shows a pipeline for a countour-based articulated registration method.

In some implementations, articulated registration can be handled in the following manner. Instead of minimizing distances between matching points, the distance between the projective contour of the model and the real observed contour from the depth images can be minimized. Using a skeleton model and a simplified representation of the problem, the articulated registration can be handled by iteratively applying segmentation and contour registration. FIG. 8 shows a pipeline for a countour-based articulated registration method.

When registering two frames, global contour registration 810 can be applied first. Global means the whole body is treated rigidly, such as discussed above. Although the assumption is weak, this step provides an initialization accurate enough for segmentation and local contour registration. After the points cloud is approximately registered globally, segmentation 820 and local contour registration 830 are iteratively applied until convergence 840 is reached.

The whole body can be regarded as consisting of several rigid parts as discussed above (see e.g., FIG. 4A and corresponding description). Each rigid part can be associated with a transformation matrix. While the front pose is set as reference, other poses can then be described as a set of rigid transformations. The vertices of joints between connecting rigid body parts can be calculated using Linear Blend Skinning (LBS). In one simplified scenario, the whole body is decomposed into head&torso, left arm, right arm, left upper leg, left lower leg, right upper leg and right lower leg, such as shown and described above in connection with FIG. 3B.

A set of rigid transformations are provided for each frame, and the parameters can be calculated by minimizing the distances between model contours and real contours. However, in developing the algorithm for this, the following issues should be addressed. First, the segmentation, which can be regarded as a per vertex labeling problem, can be addressed by iterative segmentation and registration. Second, correspondences can be explored while trying to minimize the distance between two contours without introducing the classical perspective projection assumption.

Instead of perspective projection, orthographic projection can be used. This simplifies the correspondence problem by reducing the parameters of a camera from six (three for translations and three for rotations) to only one which is the angle of comparative rotation between the sensor and the subject. The angles can be further restricted to be 0, 90, 180 and 270 degrees. In practice, the system works fine enough under these two assumptions.

Segmenting of the whole body into several parts can be performed in various ways, including model fitting or pose estimation. The segmentation 820, however, can involve applying a heuristic that first detects critical points, such as discussed above, then iteratively extracting the skeleton information, and decomposing the whole body based on the skeleton information. Once the skeleton is obtained out of the front pose, it is fixed for decomposition of the other three poses. The vertices connecting two rigid parts are assigned two transformations whose weights sum to one. The model is known as LBS in the graphics community.

The contour registration 830 can be achieved using the ICP algorithm. The correspondences between an extracted 2D contour from the depth frame and the projected 2D contour onto the same image plane are iteratively found, and the 2D transformation matrix that minimizes the distances between the corresponding points is calculated. The 2D transformation is then transformed back to a 3D transformation. The transformation is straight forward given the orthographic projection assumption.

Figure 9:
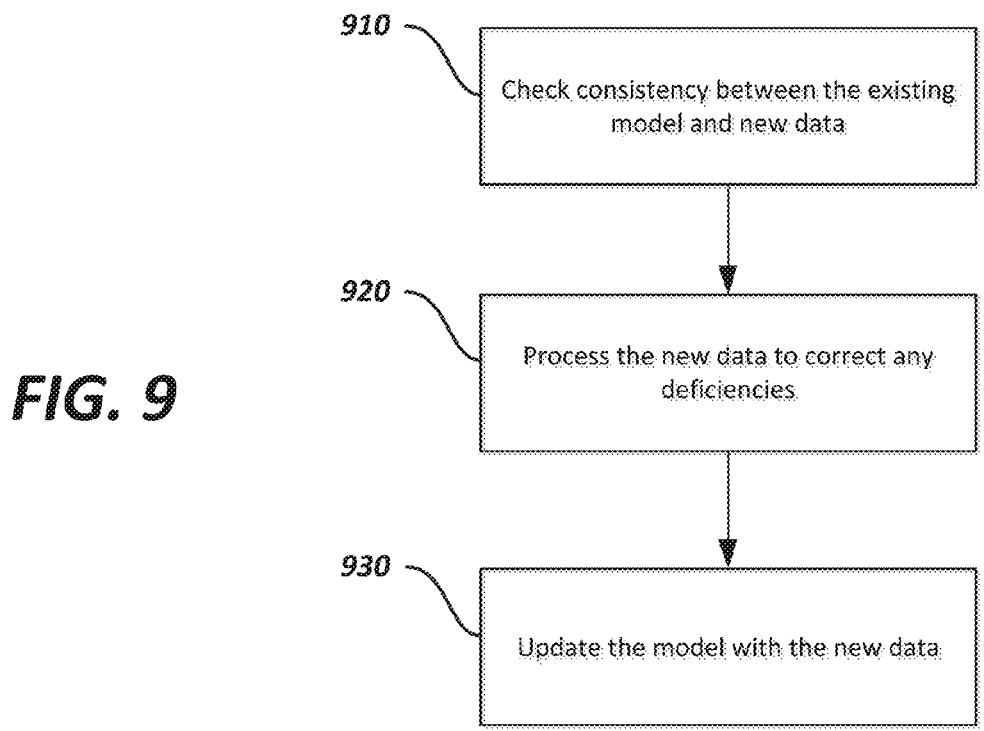
FIG. 9 shows an example of a process of updating and refining a cylindrical representation for a model of a body.

After the global and the local registration of four frames, a model that describes the basic shape of a person is obtained. To produce more surface detail, the remaining unexplored information from the other frames can be used. This can involve using the systems and techniques described in U.S. patent application Ser. No. 13/749,318, filed Jan. 24, 2013, and entitled "3D BODY MODELING, FROM A SINGLE OR MULTIPLE 3D CAMERAS, IN THE PRESENCE OF MOTION", now U.S. Publication No. 2013-0187919, and issuing as U.S. Pat. No. 9,235,928 on Jan. 12, 2016, which is hereby incorporated by reference. In addition, FIG. 9 shows an example of a process of updating and refining a cylindrical representation for a model of a body.

At 910, consistency between the existing model and new data is checked. Two main measures can be used to check the consistency. One is the average over absolute error, and the other is the Surface Interpenetration Measure (SIM) which is typically a more reliable indicator. Both are time-consuming to process when working directly in 3D space. However, in the 2D cylindrical representation, both are quick and easy to implement as shown in the following algorithms.

---

Calculating average absolute error between a depth map and a points cloud

---

Input: Cylindrical 2D depth map $\{I(u,v): u = 1 \ldots M, v = 1 \ldots K\}$
where M and K are the height and width of the depth map:
a points cloud $\{\bar{p}_i^w: i = 1 \ldots N\}$
Output: average absolute error
1. Transform points cloud from world coordinate system to local coordinate system and then to local cylindrical coordinate system
$\{\bar{p}_i^w: i = 1 \ldots N\} \to \{\bar{p}_i^l: i = 1 \ldots N\} \to \{(\rho_i, \theta_i, z_i): i = 1 \ldots N\}$
(see the description above in connection with FIG. 5)
2. Get corresponding location on depth map for each point
$\{(\rho_i, \theta_i, z_i): i = 1 \ldots N\} \to \{(\rho_i, u_i, v_i): i = 1 \ldots N\}$ 3. $\text{error} = \dfrac{\sum_{i=1}^{N} |I(u_i, v_i) - \rho_i|}{N}$ 4. return error.

---

Calculating SIM between a depth map and a points cloud

---

Input: Cylindrical 2D depth map $\{I(u, v) : u = 1 \ldots M, v = 1 \ldots K\}$ where M and K are the height and width of the depth map; a points cloud $\{\bar{p}_i^w: i = 1 \ldots N\}$
Output: SIM
1. Transform points cloud from world coordinate system to local coordinate system and then to local cylindrical coordinate system
$\{\bar{p}_i^w: i = 1 \ldots N\} \to \{\bar{p}_i^l: i = 1 \ldots N\} \to \{(\rho_i, \theta_i, z_i) : i = 1 \ldots N\}$
(see the description above in connection with FIG. 5)
2. Get corresponding location on depth map for each point
$\{(\rho_i, \theta_i, z_i) : i = 1 \ldots N\} \to \{(\rho_i, u_i, v_i) : i = 1 \ldots N\}$,
i.e. we have another depth map $\{I^p (u, v) : u = 1 \ldots M, v = 1 \ldots K\}$ representing points cloud which is very sparse
3. Get the sign map S between I and $I^p$:
$\{S(u, v) : u = 1 \ldots M, v = 1 \ldots K\} = \{\text{sign}(I(u, v) - I^p (u, v)) : u = 1 \ldots M, v = 1 \ldots K\}$ 4. Get the SIM score easily from S
5. Return SIM

---

In addition, updating of the data can performed using a running average at each pixel or a running median at each pixel.

At 920, the new data can be processed to correct any deficiencies. This can involve hole filling and smoothing. Although the points clouds, which are used to initialize and update a cylinder, are already dense, it is usually true that it won't cover every pixel on the 2D depth map. Thus, the missing values should be interpolated on the depth map, which is the same as filling holes on the corresponding 3D surface. This can be done using linear interpolation on the depth map, which corresponds to a circular interpolation on the 3D surface. This can facilitate forming the missing shape of a person. In addition, bilateral filtering can be applied to the depth map, which can remove the noise while at the same time preserve the edges.

At 930, the model can be updated using the processed data. As will be appreciated, use of the cylindrical representation facilitates correcting deficiencies in the data, due to the nature of the 3D camera, as well as facilitating updates to the model. Another advantage of the cylindrical representation is that it can be readily sampled. For example, sampling from the depth map can be done in two ways: uniform sampling and uniform normal sampling. Uniform sampling involves sampling along the row and column of the depth map every k pixels. The larger the step k, the smaller the resolution of the result after sampling. Uniform sampling is quick and easy, but not always very accurate. The information on the depth map is usually not uniformly distributed and it would be preferable to sample more from the 'sharp' area to preserve the edge information. Thus, uniform normal sampling can be used. From the cylindrical depth map, the normal map can be calculated and used in a uniform normal sampling process.

Figure 10:
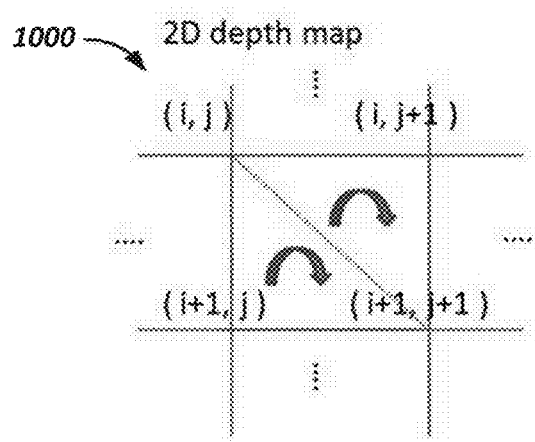
FIG. 10 shows meshing directly from a cylindrical depth map.

Meshing on the cylindrical representation is also straight forward since the connectivity between points are already given. Hence, the connected points can be directly mesh as shown at 1000 in FIG. 10. Meshing can be done in the clockwise direction, thus obtaining two triangles from 4 points, which are ((i,j), (i+1,j+1)) (i+1,j)) and ((i,j), (i, j+1), (i+1,j+1)).

In addition, to describe a complex 3D shape, junctions between two or three cylindrical representations should be handled. A solution is to extend the axes connecting multiple parts so as to account for all points. At this stage a representation of the integrated cloud of 3D points is produced in terms of a segmented description of the surfaces. If an overlapping region is in a concave area in the 3D surface, 2D cylindrical maps may contain some holes, but a smooth surface should be obtained even with the presence of noisy 3D points.

Depth map transformation and blending can be employed. The cylindrical representation allows a single continuous mesh to be built in a consistent way for different types of junctions. A critical point can be defined in the center of a junction, in where two or three cylindrical systems join, and separating plane(s) can be defined, which separate these cylindrical representations in the 3D space. Then, the overlapping area can be blended using a depth map transformation and simple filtering. This depth blending method can be used for many types of configurations, provided reasonable local cylindrical systems for different configurations. The following description provides details of the depth map blending method for a bent limb, the body center, and a shoulder region.

Figure 11A:
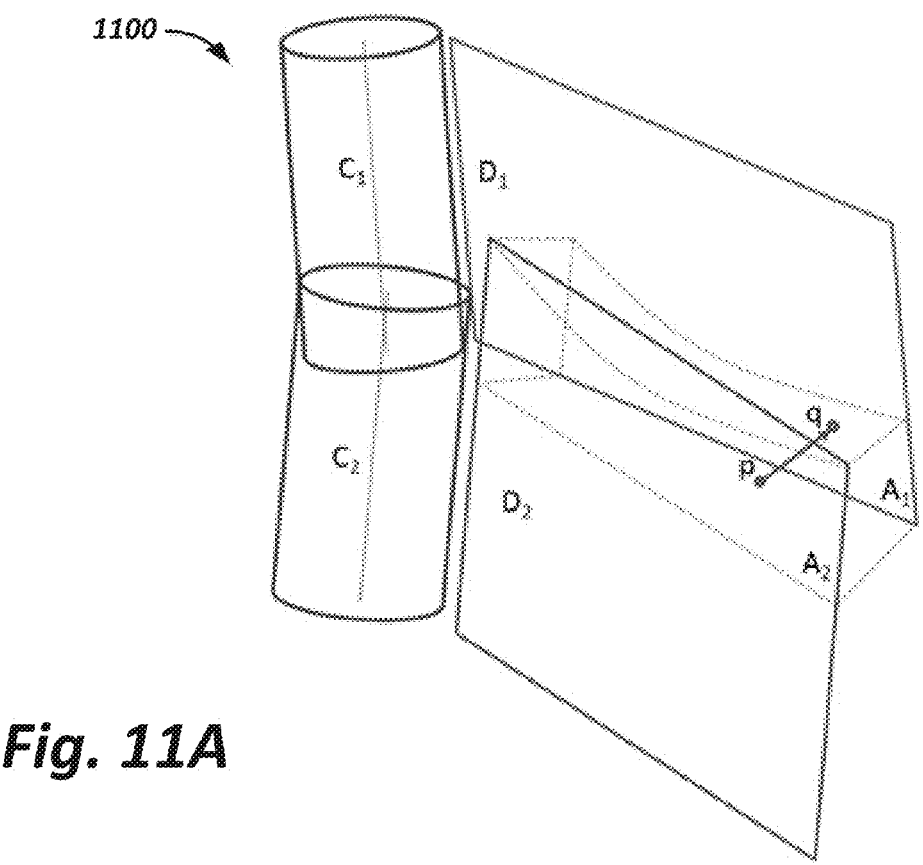
FIG. 11A shows depth blending between two cylindrical maps for a bent limb.

FIG. 11A shows depth blending between two cylindrical maps 1100 for a bent limb. The bent limb (or L-shape) is a case in which two cylindrical representations smoothly connect and are represented by two connected cylindrical coordinate systems, C1 and C2. A critical point can be located in the center of the junction and a separating plane between two cylindrical representations. The critical point lies on the separating plane. This point and plane can be inferred, e.g., by using a skeleton fitting procedure. Then, the overlapping region can be defined to have a smooth surface.

Suppose that two unwrapped cylindrical maps, D1 and D2, have overlapping regions A1 and A2, respectively. Even though the regions A1 and A2 represent the identical surface area in the 3D space, the values of depth maps cannot be the same, $p \neq q$, because the values are represented with respect to the two different cylindrical systems, as shown in FIG. 11A.

To blend two depth maps, a map is transformed into the other cylindrical system. One of the cylindrical maps can be set as a reference map and each pixel, $p(i)$, of the target map can be transformed to the reference map. A 3D point can be represented as either a 3D vector in original 3D space, $X=[X, Y, 7]$, or a 2D point in an unwrapped cylindrical map, $p=[u,v]$. Let $h()$ be a function which maps from the 3D space to the 2D map $D(j)$. Given a point $p(i)$ in a depth map D2 from C2, a 3D point $X(i)$ can be reconstructed and projected onto C1 to acquire a transformed point $q(i)$ in depth map D1 space, $q(i)=h(inv\ h\ p(i)))$. With a set of transformed points $\{q(i)\}$ created, the overlapping region can be blended using a simple filtering method in order to have smooth joining parts. For instance, a simple weighted averaging can be applied for a pair of corresponding points $(q(i), q'(i))$.

Additional blending techniques can also be used. If the distance between two values is less than a threshold, $|p(i)-q(i)|<TH$, a weighted average of values can be taken, $$n=w*p(i)+(1-w)*q(i),$$

where w is the weighting parameter ($0<=w<=1$) representing a normalized distance from the end of the reference map. For instance, if the blending position is located in the center of overlapping area, the mean of two depth values can be taken: $[p(i)+q(i)]/2$. Otherwise, if the distance between two values is equal or greater than a threshold, the value can be undecided and the location can be set as a hole. After blending all pixels, a simple linear interpolation method can be used to fill out any holes.

Figure 11B:
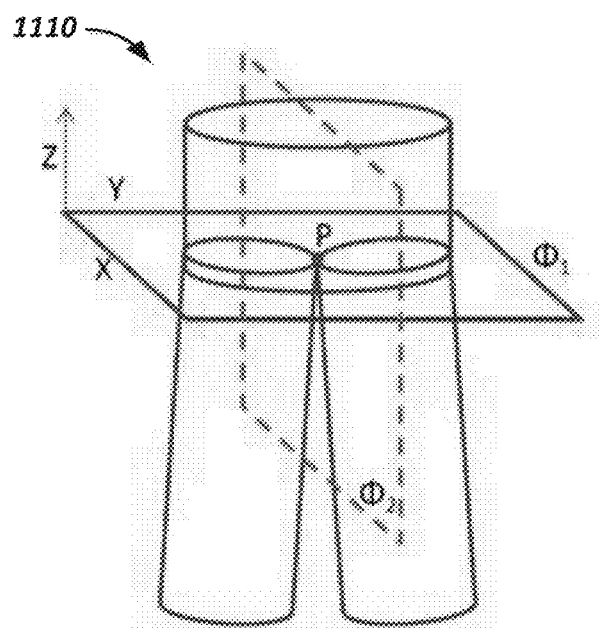
FIG. 11B shows depth blending between cylindrical maps for a body center.

FIG. 11B shows depth blending between two cylindrical maps for a body center 1110. This Y-shape shown in FIG. 11B includes a critical point (P) and separating plane ($\Phi 1$) for the body center 1110. A difficult area to model for the human body is the junction between upper body and two legs. The critical point ('the body center') P, can be defined in the center of the junction, a separating plane can be defined between the upper body and the two legs ($\Phi 1$ in FIG. 11B), perpendicular to the torso cylinder axis, and another plane ($\Phi 2$ in FIG. 3B) can be defined to separate the two legs, perpendicular to the plane $\Phi 1$. The pose of plane $\Phi 1$ can be initialized by the ground plane and be adjusted by estimation methods described further below. The critical point P is in the intersection of two planes. The use of skeleton fitting allows estimation of an initial position of the critical point and initial positions of the two planes. Accurate estimation of the critical point and separating planes is described in further detail below.

For depth blending, an overlapping region can be defined around the separating plane $\Phi 1$. When two legs are segmented using the plane $\Phi 2$, the upper part of each leg may contain some holes while the lower part of the leg can be separated clearly. Since, the diameter of each cylinder for a leg is slightly greater than the actual diameter of the sectional circle, the hole filling method can generate a virtual surface which corresponds to the hole pixels.

The cylindrical map generated from the upper body can be set as a reference map and each pixel, $p(i)$, of this map can be compared with a transformed pixel, $$q(i)=h\_j(inv\ h\_i(p(i))),$$

from the target map, generated from the leg. A weighted average of two values $\{p(i), q(i)\}$ can be used as long as the distance between two values is less than a threshold: $|p(i)-q(i)|<TH$. Otherwise, if the distance between two values is equal or greater than a threshold, the value of the location can be set as a hole. After blending all pixels, a simple linear interpolation method can be used to fill out any holes.

Figure 11C:
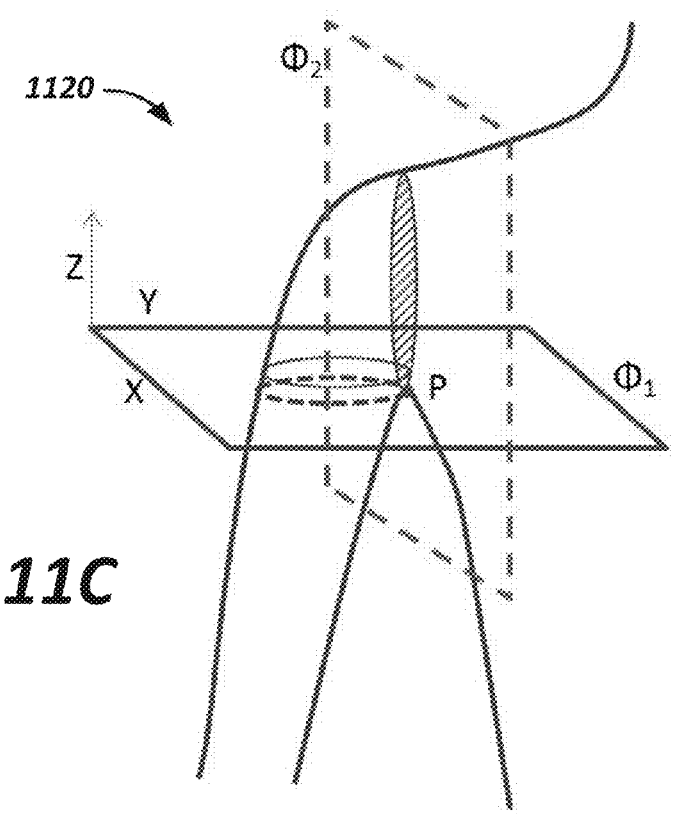
FIG. 11C shows a shoulder junction and blending area.

FIG. 11C shows shoulder junction and blending area. A shoulder area 1120 of the body forms a T-shape junction. A critical point P can be defined in the center of the junction, and a separating plane ($\Phi 1$) can be defined between the upper body and the arm, perpendicular to the torso cylinder axis, and another plane ($\Phi 2$) can be defined to separate the arm and the torso, perpendicular to the plane $\Phi 1$. The critical point is in the intersection of two planes. For depth blending, an overlapping region can be defined around the separating plane $\Phi 1$. When the arm area is segmented from the torso, the reconstructed arm may contain some holes, which is similar to the case of the body center described above. For depth map blending, the same robust blending method can be applied as described above for the body center.

The cylindrical representations can be used to produce a 3D mesh, which can be useful for visualization and further processing. For a single cylindrical representation, the mesh can be created by creating triangles among the neighboring pixels on a 2D unwrapped cylindrical map. Also, the mesh structure can be simplified by controlling the distance between neighboring pixels. However, to complete meshing for the whole body, connected by many cylindrical representations, a smooth transition between connected parts should be used.

When building a uniform single mesh for the whole body, an inhomogeneous mesh structure can give an obvious seam on the joining part even if a continuous surface is provided. Heuristic techniques can be used to produce a continuous surface for junctions. A reference mesh can be defined, for instance the upper body layer, and for each vertex in the reference mesh, the nearest vertex in the corresponding layer (e.g., leg layer) can be found to form a triangle. Finding the nearest vertex can be computed using Euclidean distance in 3D space. Note that a many-to-one mapping between two sets of points is allowed. Note further that simplification of the mesh to reduce the number of triangles, and to remove overlapping ones, can also be performed using existing tools such as Blender or MeshLab.

In general, the finding of critical points and separating planes can be performed as follows. A critical point and separate planes can be found automatically in a joining area for the depth/mesh blending. The details of such methods are now described for the body center case, the junction between upper body and two legs, but the principles are applicable to other junction types.

Figure 11D:
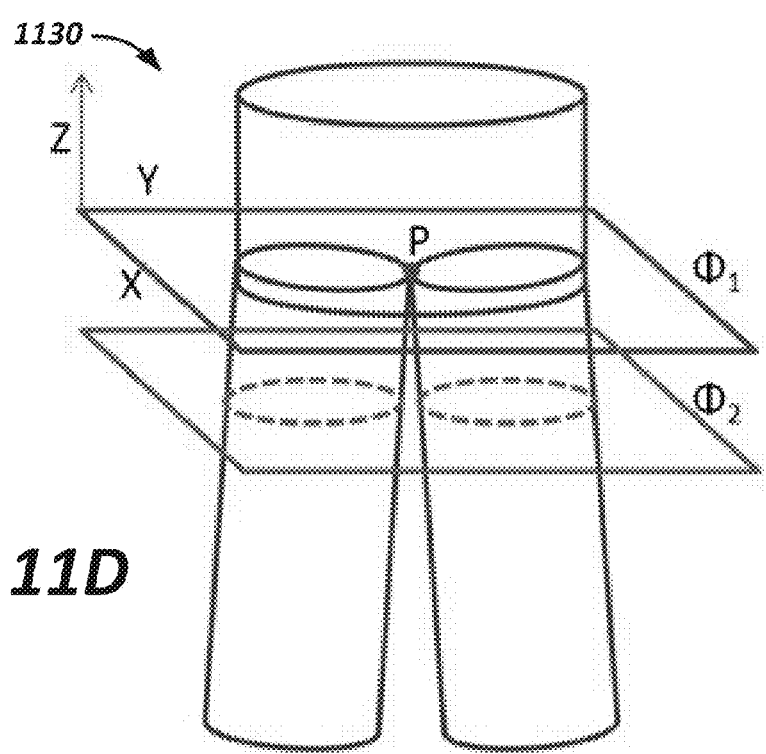
FIG. 11D shows another example of depth blending between cylindrical maps for a body center.

FIG. 11D shows another example of depth blending between cylindrical maps for a body center 1130. A critical point ('the body center') P is defined in the center of the junction, as the origin of the local coordinate system so that the XY-plane ($\Phi_1$ in FIG. 11D) is a separating plane between the upper body and the two legs, parallel to the ground plane. The XZ-plane is another plane, perpendicular to the ground plane, separating the two legs. The use of skeleton fitting allows estimation of an initial position of the critical point and initial positions of the two planes. Then, an accurate position of the point can be estimated by several methods described as follows.

In a first method, cylindrical model fitting can be used. The body center can be represented using three cylinders as shown in the cylindrical model for the body center in FIG. 11D. The initial pose of cylinders and parameters can be estimated by the skeleton fitting method. The length of the cylinders need not be estimated. Symmetry and identical shape of the two legs can be assumed. Hence, the location of cylinder base (z1), the angle between two legs ($\theta$), the rotation of body (r), the radiuses of cylinders (r1, r2) are the parameters that need to be estimated. Various known techniques, such as RANSAC (RANdom SAmple Consensus) or MCMC (Markov chain Monte Carlo) can be used for this parameter fitting problem.

In a second method, quadratic surface fitting can be used. A specific type of quadric surface, such as a hyperbolic paraboloid (e.g., 6.25 x^2−1.562 y^2+5.8 z−1=0), can be used to model the shape of the body center. A quadric surface is the zero set of a quadratic expression in three Cartesian coordinates (x,y,z). The generic form is given by $$\frac{x^2}{a^2} + i\frac{y^2}{b^2} + j\frac{z^2}{c^2} + d = 0,$$

where a, b and c are coefficients and i, j and d define the types of quadrics. For the body center as a hyperbolic paraboloid, i, j and d can be set to −1(i=j=d=−1). The angle between two legs, the curve of the body center, and the curvature of the leg surface are represented by parameters a, b and c, respectively. Three coefficients (a, b and c) can be found for the shape, and three translations (x'=x−$t_x$,y'=y−$t_y$,z'=z−$t_z$) can be found for the location of body center. The orientation of the shape can be computed using the skeleton fitting method. The RANSAC method can be used for this parameter fitting problem in the presence of noisy depth information.

In a third method, principal component analysis can be used. Principal component analysis (PCA) can be used to find the accurate pose of the separating plane for the body center. An initial location of the critical point $\tilde{P}$ and initial pose of XY plane ($\tilde{\Phi}_1$) can be estimated. The point $\tilde{P}$ can be estimated by the skeleton fitting result, and the orientation of the plane $\tilde{\Phi}_1$ is the same as the ground plane which can be inferred from an initial calibration step. A new plane ($\tilde{\Phi}_2$) can be defined from the initial plane $\tilde{\Phi}_1$, parallel to the XY-plane ($\Phi_1$), at location Y−dY. To find the accurate orientation of the plane $\tilde{\Phi}_2$, the spatial distribution of the 3D point cloud between two planes $\Phi_1$ and $\Phi_2$ can be analyzed. A plane defined by the two largest eigen vectors gives the orientation of the planes $\Phi_1$ and $\Phi_2$.

A search space can be defined between Z−dZ to Z+dZ and a plane (Z value) can be found which gives the maximum kurtosis of the projected point cloud while the estimated critical point has a number of neighbor points. To find the Z value, a cost function can be defined as $$\mathrm{argmin}(z)\left(Kurt(WX) + \lambda\frac{1}{N(P, Q(j), \theta)}\right),$$

where Kurt( ) represents kurtosis of the projected point cloud onto the first eigen vector of the plane $\Phi_2$, W is the projection matrix, $\lambda$ is a weighting parameter, N(P,Q(j),$\theta$) is a function to count the number of neighboring points Q(j) within a threshold $\theta$ with respect to the critical point P. After finding the pose of the separating plane $\Phi_1$, the critical point P is located by the median value of 3D points on the plane $\Phi_1$.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously or at least concurrently. In certain implementations, multitasking and parallel processing may be preferable.

The various implementations described above have been presented by way of example only, and not limitation. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, the principles, elements and features described may be employed in varied and numerous implementations, and various modifications may be made to the described embodiments without departing from the spirit and scope of the invention. Accordingly, other embodiments may be within the scope of the following claims.

What is claimed is:

1. A method performed by a computer system comprising processor electronics and at least one memory device, the method comprising:
    obtaining multiple three dimensional (3D) point clouds captured using one or more 3D cameras, wherein at least two of the 3D point clouds correspond to different positions of a body relative to at least a single one of the one or more 3D cameras;
    identifying two of the 3D point clouds as corresponding to two predefined poses, wherein the identifying comprises looking for a static frame using a pixel-wise absolute difference map between two consecutive depth maps for the 3D point clouds; and
    generating, based on the two 3D point clouds identified as corresponding to the two predefined poses, a segmented representation of the body in accordance with a 3D part-based volumetric model comprising cylindrical representations.

2. The method of claim 1, wherein:

the identifying comprises identifying four of the 3D point clouds as corresponding to four predefined poses, including a forward pose, a left facing pose, a backward pose, and a right facing pose, and wherein the identifying comprises using a bounding box in depth maps for the 3D point clouds to identify the left facing pose and the right facing pose; and the generating comprises generating, based on the four 3D point clouds identified as corresponding to the four predefined poses, the segmented representation of the body in accordance with the 3D part-based volumetric model comprising cylindrical representations.

3. The method of claim 2, wherein the one or more 3D cameras is a single 3D camera.

4. The method of claim 2, wherein the obtaining comprises capturing the multiple 3D point clouds using the one or more 3D cameras.

5. The method of claim 2, wherein the identifying comprises automatically identifying the 3D point clouds without user input corresponding to the predefined poses.

6. The method of claim 2, wherein the generating comprises:

registering the four 3D point clouds with each other; and building an initial model of the body using the four registered 3D point clouds.

7. The method of claim 6, wherein the generating comprises refining the initial model using one or more 3D point clouds other than the four 3D point clouds identified as corresponding to the four predefined poses.

8. The method of claim 6, wherein the registering comprises:

registering the two 3D point clouds corresponding to the forward pose and the left facing pose;

registering the two 3D point clouds corresponding to the forward pose and the right facing pose; and registering the two 3D point clouds corresponding to the left facing pose and the backward pose.

9. The method of claim 1, wherein the generating comprises using iterative local registration of limbs and a torso for the body.

10. The method of claim 1, wherein the segmented representation comprises a segmented mesh representing the body.

11. A non-transitory computer-readable medium, which encodes a computer program product that is operable to cause data processing apparatus to perform operations comprising:

obtaining multiple three dimensional (3D) point clouds captured using one or more 3D cameras, wherein at least two of the 3D point clouds correspond to different positions of a body relative to at least a single one of the one or more 3D cameras;

identifying two of the 3D point clouds as corresponding to two predefined poses, wherein the identifying comprises looking for a static frame using a pixel-wise absolute difference map between two consecutive depth maps for the 3D point clouds; and generating, based on the two 3D point clouds identified as corresponding to the two predefined poses, a segmented representation of the body in accordance with a 3D part-based volumetric model comprising cylindrical representations.

12. The non-transitory computer-readable medium, of claim 11, wherein:

the identifying comprises identifying four of the 3D point clouds as corresponding to four predefined poses, including a forward pose, a left facing pose, a backward pose, and a right facing pose, and wherein the identifying comprises using a bounding box in depth maps for the 3D point clouds to identify the left facing pose and the right facing pose; and the generating comprises generating, based on the four 3D point clouds identified as corresponding to the four predefined poses, the segmented representation of the body in accordance with the 3D part-based volumetric model comprising cylindrical representations.

13. The non-transitory computer-readable medium, of claim 12, wherein the one or more 3D cameras is a single 3D camera, the obtaining comprises capturing the multiple 3D point clouds using the single 3D camera, and the identifying comprises automatically identifying the 3D point clouds without user input corresponding to the predefined poses.

14. The non-transitory computer-readable medium, of claim 12, wherein the generating comprises:

registering the four 3D point clouds with each other; and building an initial model of the body using the four registered 3D point clouds.

15. The non-transitory computer-readable medium, of claim 14, wherein the generating comprises refining the initial model using one or more 3D point clouds other than the four 3D point clouds identified as corresponding to the four predefined poses.

16. The non-transitory computer-readable medium, of claim 14, wherein the registering comprises:

registering the two 3D point clouds corresponding to the forward pose and the left facing pose;

registering the two 3D point clouds corresponding to the forward pose and the right facing pose; and registering the two 3D point clouds corresponding to the left facing pose and the backward pose.

17. The non-transitory computer-readable medium, of claim 11, wherein the generating comprises using iterative local registration of limbs and a torso for the body, and the segmented representation comprises a segmented mesh representing the body.

18. A system comprising:

a user interface device; and one or more computers operable to interact with the user interface device, the one or more computers comprising at least one processor and at least one memory device, and the one or more computers programmed to perform operations comprising: obtaining multiple three dimensional (3D) point clouds captured using one or more 3D cameras, wherein at least two of the 3D point clouds correspond to different positions of a body relative to at least a single one of the one or more 3D cameras; identifying two of the 3D point clouds as corresponding to two predefined poses, wherein the identifying comprises looking for a static frame using a pixel-wise absolute difference map between two consecutive depth maps for the 3D point clouds; and generating, based on the two 3D point clouds identified as corresponding to the two predefined poses, a segmented representation of the body in accordance with a 3D part-based volumetric model comprising cylindrical representations.

19. The system of claim 18, wherein the one or more computers comprise a server operable to interact with the user interface device through a data communication network, and the user interface device is operable to interact with the server as a client.

20. The system of claim 18, wherein the identifying comprises identifying four of the 3D point clouds as corresponding to four predefined poses, including a forward pose, a left facing pose, a backward pose, and a right facing pose, wherein the identifying comprises using a bounding box in depth maps for the 3D point clouds to identify the left facing pose and the right facing pose, and wherein the generating comprises generating, based on the four 3D point clouds identified as corresponding to the four predefined poses, the segmented representation of the body in accordance with the 3D part-based volumetric model comprising cylindrical representations.

* * * * *